US012059009B2

(12) United States Patent
Runkel et al.

(10) Patent No.: US 12,059,009 B2
(45) Date of Patent: Aug. 13, 2024

(54) TRANSPORT SYSTEM FOR AN INDUSTRIAL CONFECTIONERY MACHINE

(71) Applicant: Winkler und Dunnebier Süßwarenmaschinen GmbH, Rengsdorf (DE)

(72) Inventors: Rainer Runkel, Rengsdorf (DE); Christian Freund, Kurtscheid (DE); Jörg Daumann, Nümbrecht (DE); Felix Reinhard, Rengsdorf (DE)

(73) Assignee: Winkler und Dünnebier Süßwarenmaschinen GmbH, Rengsdorf (DE)

( * ) Notice: Subject to any disclaimer, the term of this patent is extended or adjusted under 35 U.S.C. 154(b) by 288 days.

(21) Appl. No.: 17/423,561

(22) PCT Filed: Jan. 16, 2020

(86) PCT No.: PCT/EP2020/050960
§ 371 (c)(1),
(2) Date: Jul. 16, 2021

(87) PCT Pub. No.: WO2020/148359
PCT Pub. Date: Jul. 23, 2020

(65) Prior Publication Data
US 2022/0110336 A1    Apr. 14, 2022

(30) Foreign Application Priority Data
Jan. 18, 2019  (DE) .................... 10 2019 101 290.2

(51) Int. Cl.
*A23G 3/02*  (2006.01)
*A23G 1/26*  (2006.01)
*B65G 54/02* (2006.01)

(52) U.S. Cl.
CPC ............. *A23G 3/0278* (2013.01); *A23G 1/26* (2013.01); *B65G 54/02* (2013.01)

(58) Field of Classification Search
CPC ...... A23G 1/26; A23G 3/0278; A23G 3/2046; A23G 1/205; A23G 3/0252; A23G 3/2023;
(Continued)

(56) References Cited

U.S. PATENT DOCUMENTS

| 2011/0041706 A1 | 2/2011 | Whetstone, Jr. |
| 2018/0213813 A1 | 8/2018 | Lenssen et al. |
| 2020/0030995 A1* | 1/2020 | Lu ........................... H02K 7/14 |

FOREIGN PATENT DOCUMENTS

| DE | 725504 C | 9/1942 |
| DE | 10 2005 018 416 A1 | 11/2006 |

(Continued)

OTHER PUBLICATIONS

EP 3031334 (Year: 2016).*
(Continued)

*Primary Examiner* — Vy T Nguyen
(74) *Attorney, Agent, or Firm* — Cahn & Samuels LLP

(57) ABSTRACT

The invention relates to a conveyor system for moulds (12) of an industrial confectionery machine (2), which comprises a plurality of production stations (P1, P2, P3, P4, 3, 4, 5, 6, 7) and moulds (12) for producing at least one confectionery article, wherein with the confectionery machine (2), a mould (12) can be conveyed to the various production stations (P1, P2, P3, P4, 3, 4, 6,, 7) for successive production steps, comprising a conveyor rail (8, 8a, 8b, 72, 73, 74, 75, 76, 77, 79, 80, 81, 82) and a drive device (9, T1, 67, D1, D2, D3, G1, G2, G3), with which a conveyance movement for a mould (12) can be produced in order to convey the mould (12) along the conveyor rail (8, 8a, 8b, 72, 73, 74, 75, 76, 77, 79, 80, 81, 82) to the production stations (P1, P2, P3, P4, 3, 4, 5, 6, 7).

20 Claims, 31 Drawing Sheets

Figure 1:
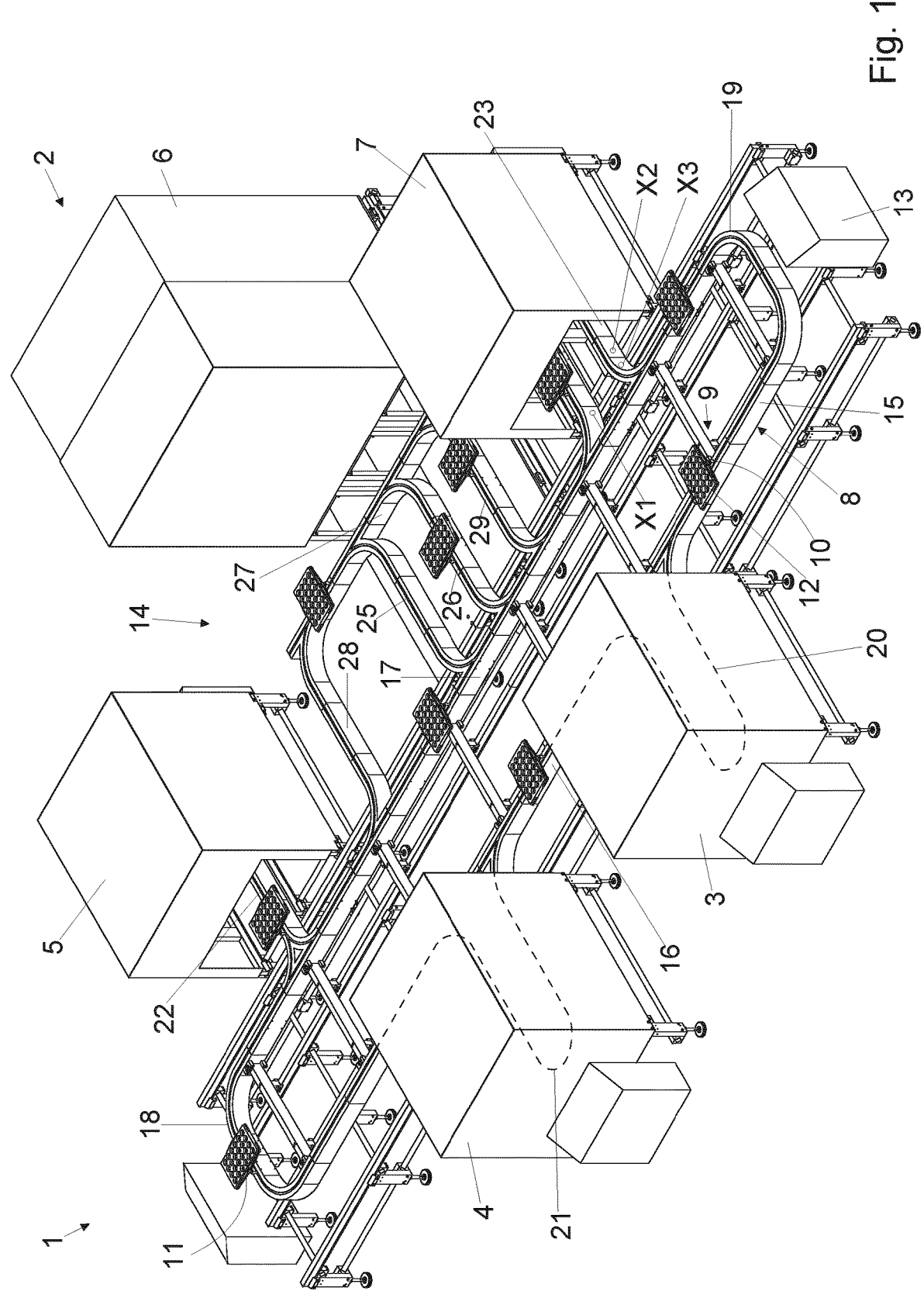

(58) Field of Classification Search
CPC ........ A23G 1/22; A23G 3/0036; B65G 25/02; B65G 25/04; B65G 25/08; B65G 25/10; B65G 25/12; B65G 35/06; B65G 54/02; A23P 30/10; G05B 19/4183; G05B 2219/31283; G05B 2219/31322; B29C 45/0084; B29C 45/1756; B29C 45/176
USPC ........ 198/750.2; 426/389, 512; 99/353, 427, 99/443
See application file for complete search history.

(56) References Cited

FOREIGN PATENT DOCUMENTS

| | | | |
|---|---|---|---|
| DE | 10 2005 018 416 B4 | 3/2007 |
| EP | 2 108 263 A1 | 10/2009 |
| EP | 3 031 334 A1 | 6/2016 |
| EP | 3 111 768 A1 | 1/2017 |

OTHER PUBLICATIONS

European Patent Office, International Search Report for Application No. PCT/EP2020/050960, Mar. 27, 2020, pp. 2-3.
European Patent Office, Written Opinion for Application No. PCT/EP2020/050960, Mar. 27, 2020, pp. 1-7.
European Patent Office, International Preliminary Report on Patentability for Application No. PCT/EP2020/050960, 2021, pp. 1-7.
European Patent Office, English Abstract for DE102005018416 A1, printed on Jun. 30, 2021.
European Patent Office, English Abstract for EP3031334A1, printed on Jun. 30, 2021.
European Patent Office, English Abstract for EP3111768A1, printed Jun. 30, 2021.
The International Bureau of WIPO, English translation of the International Preliminary Report on Patentability (Chapter I of the Patent Cooperation Treaty) for Application No. PCT/EP2020/050960, Jun. 16, 2021, pp. 1-8.

* cited by examiner

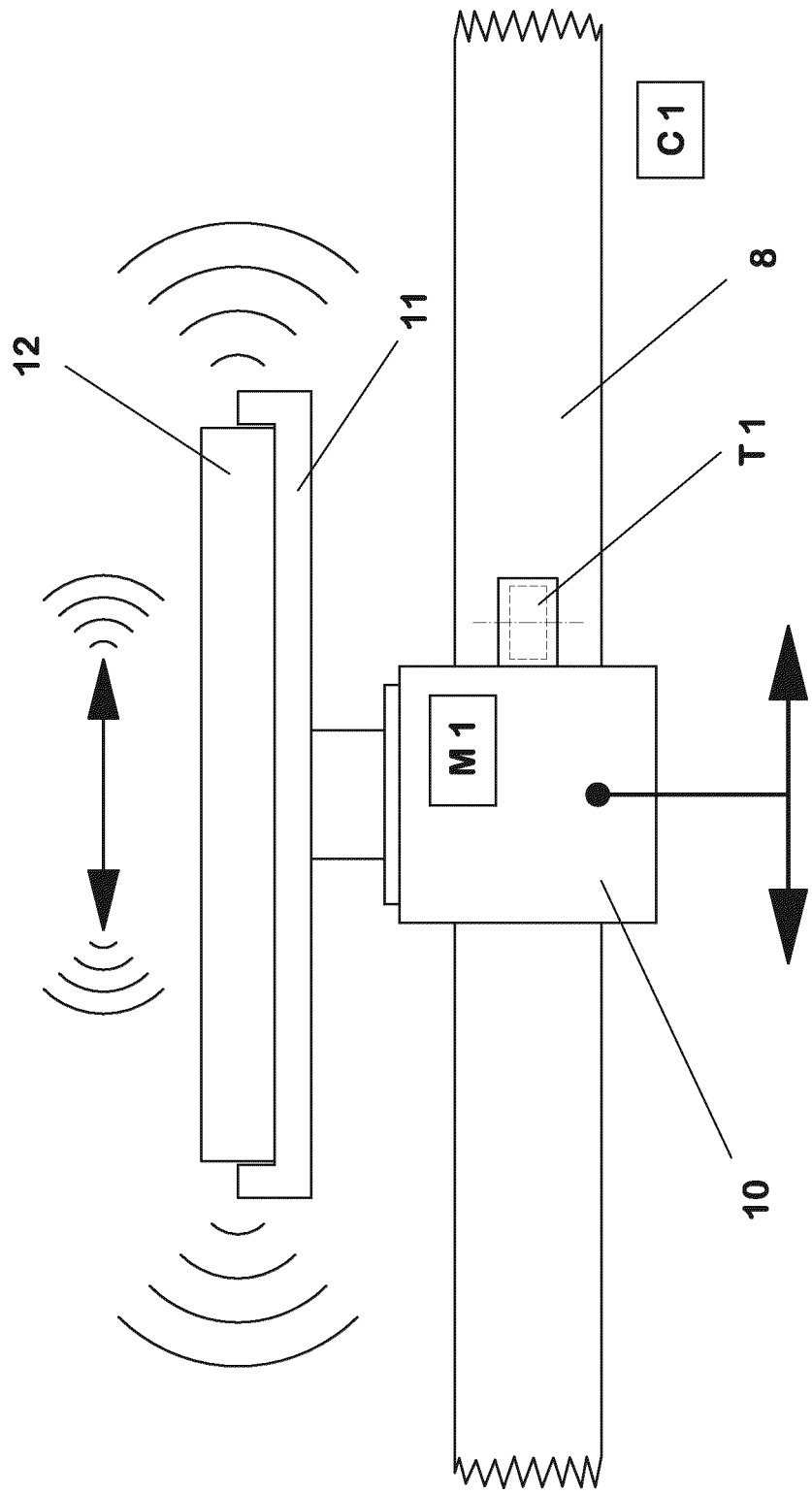

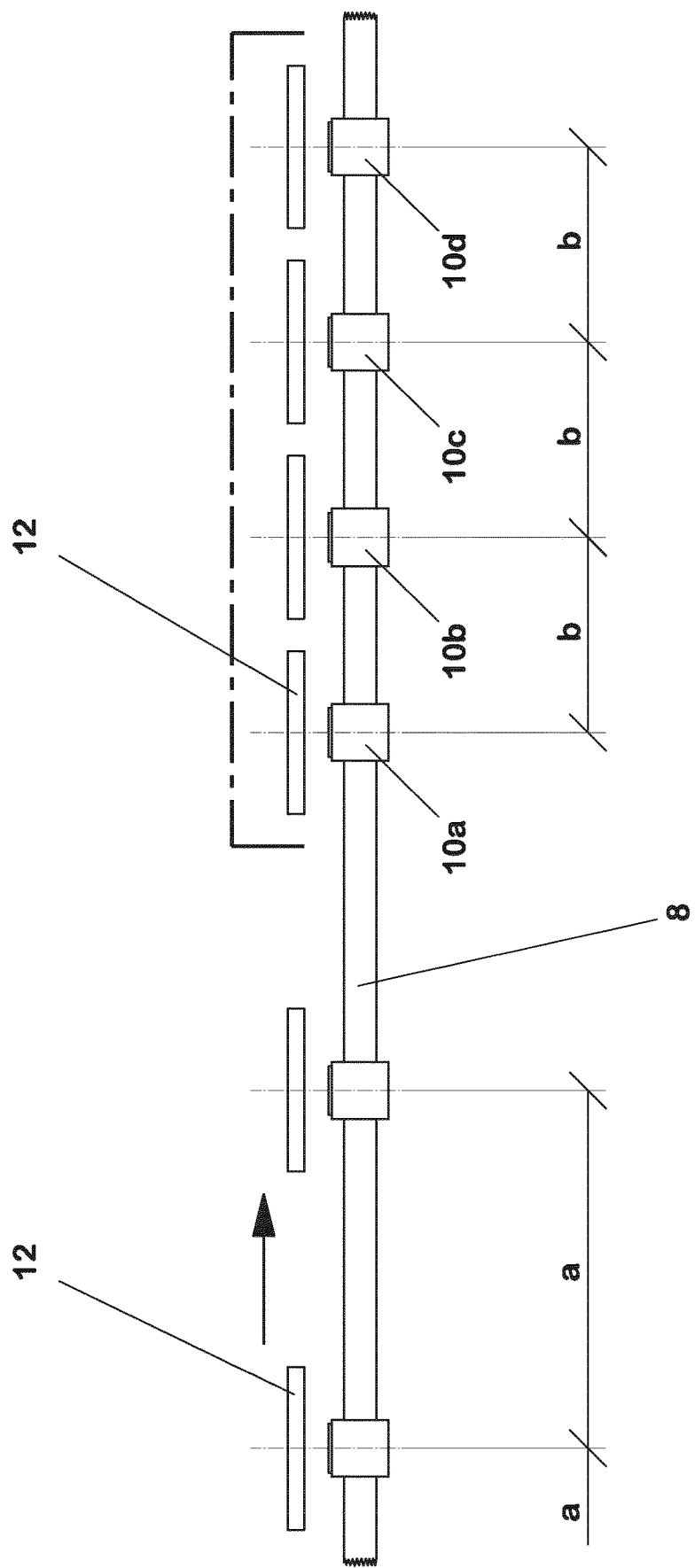

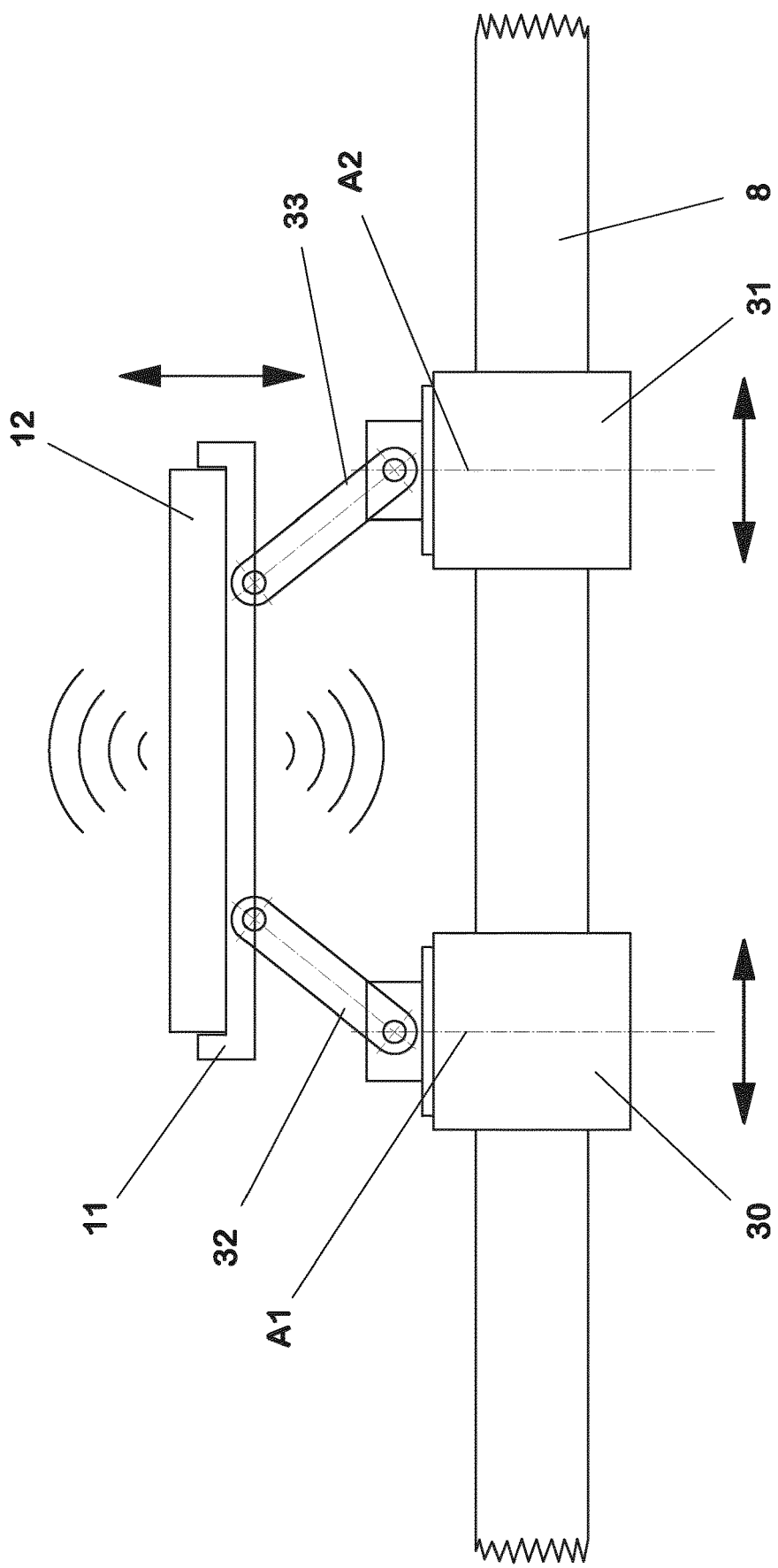

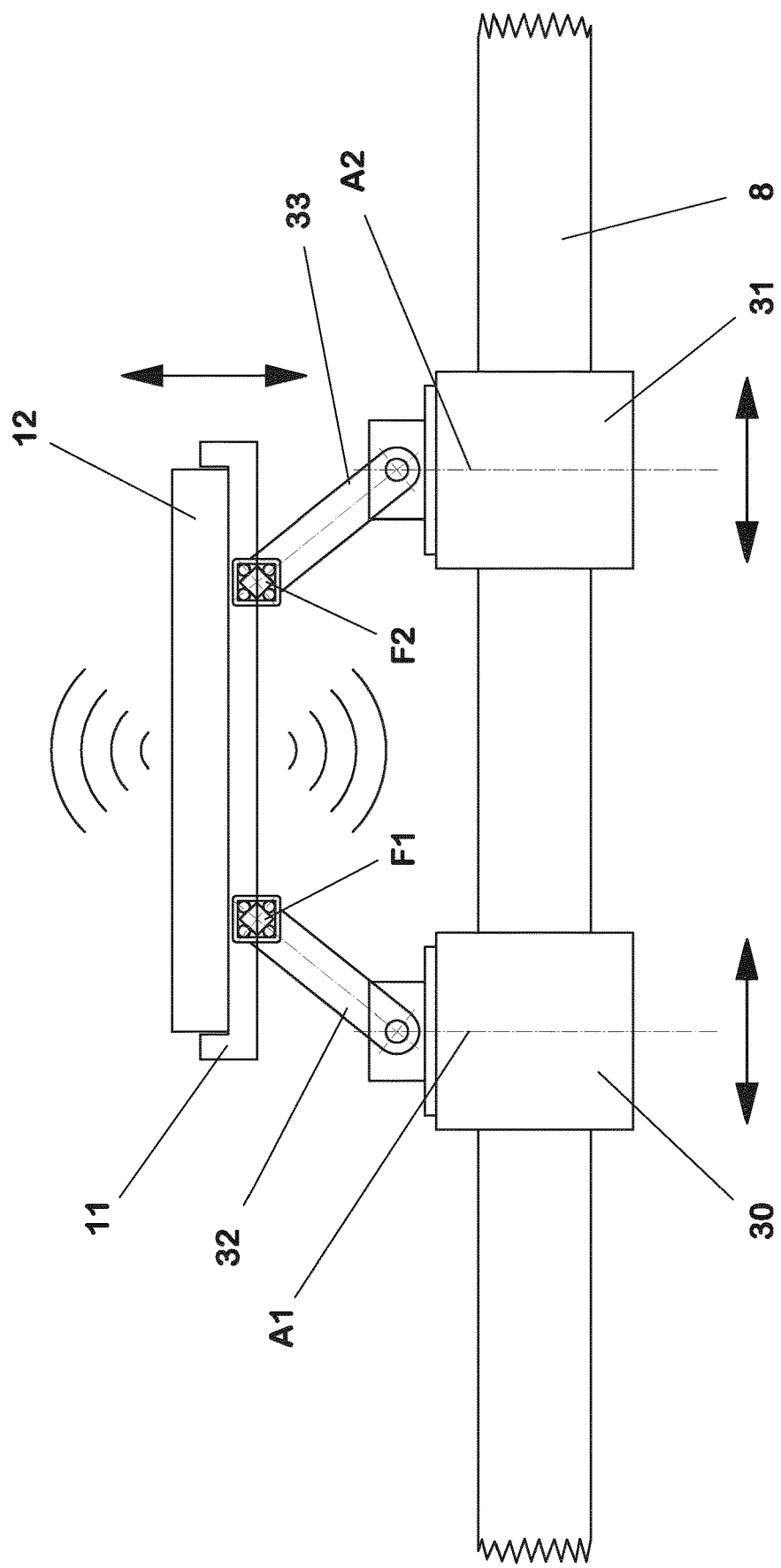

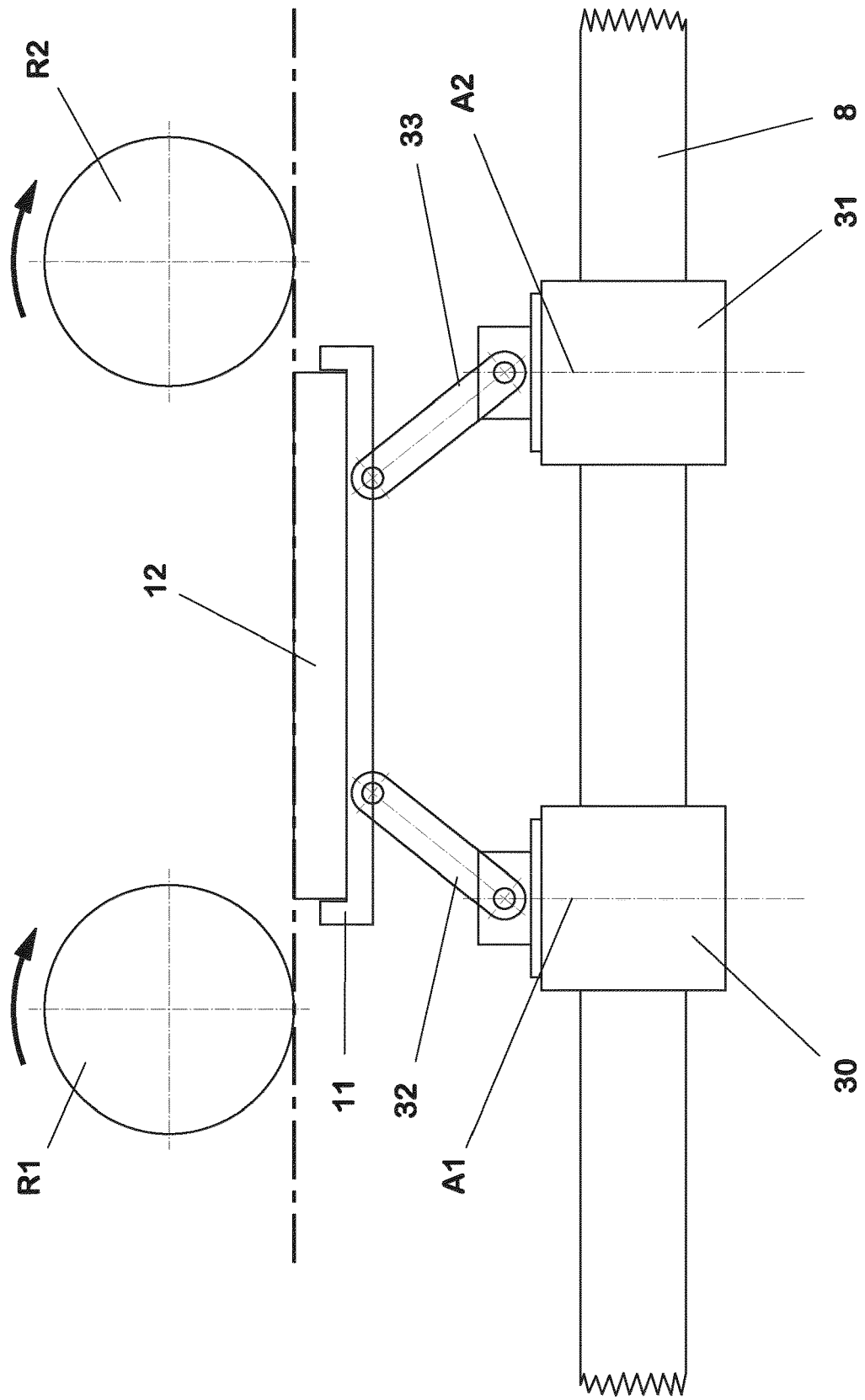

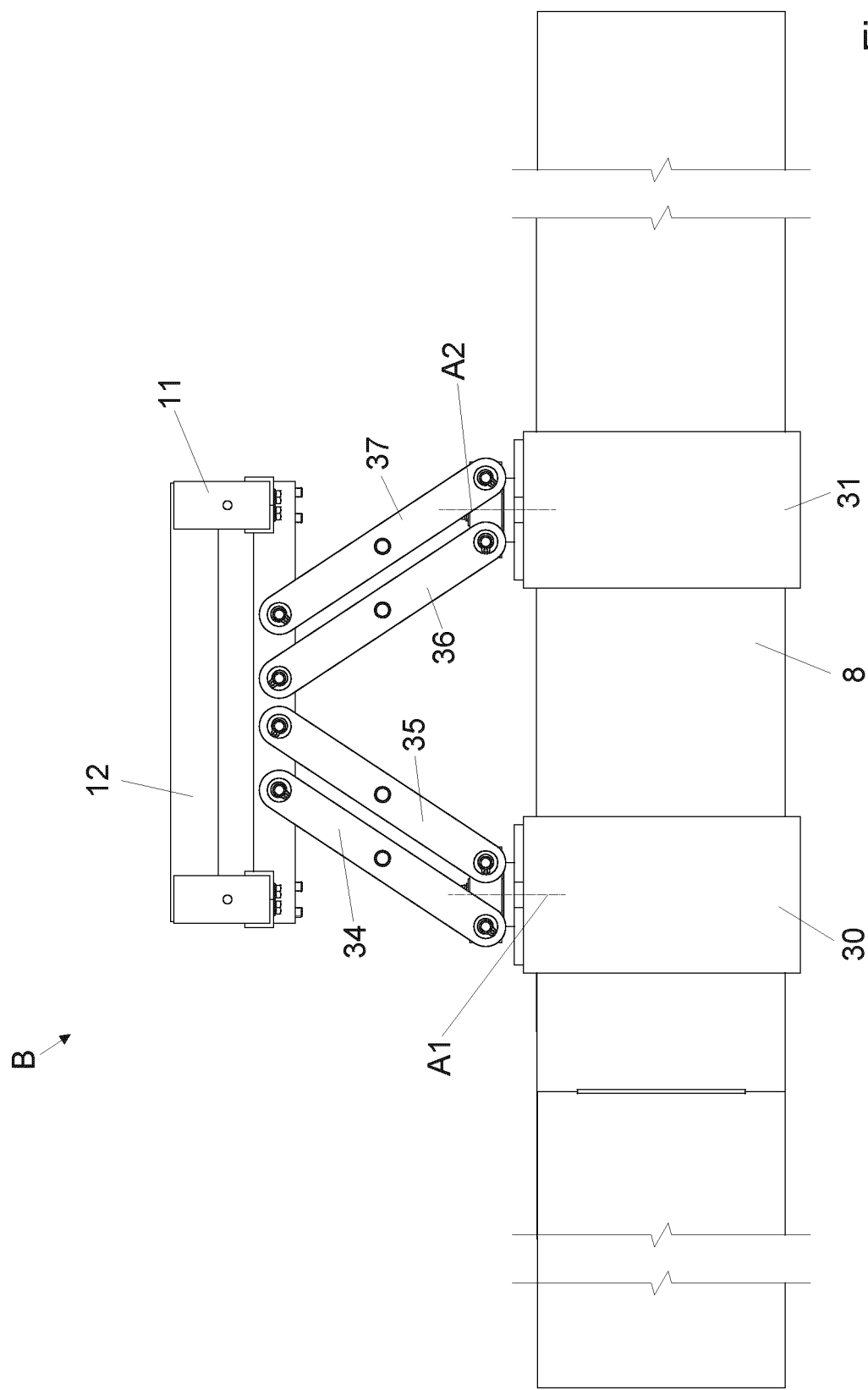

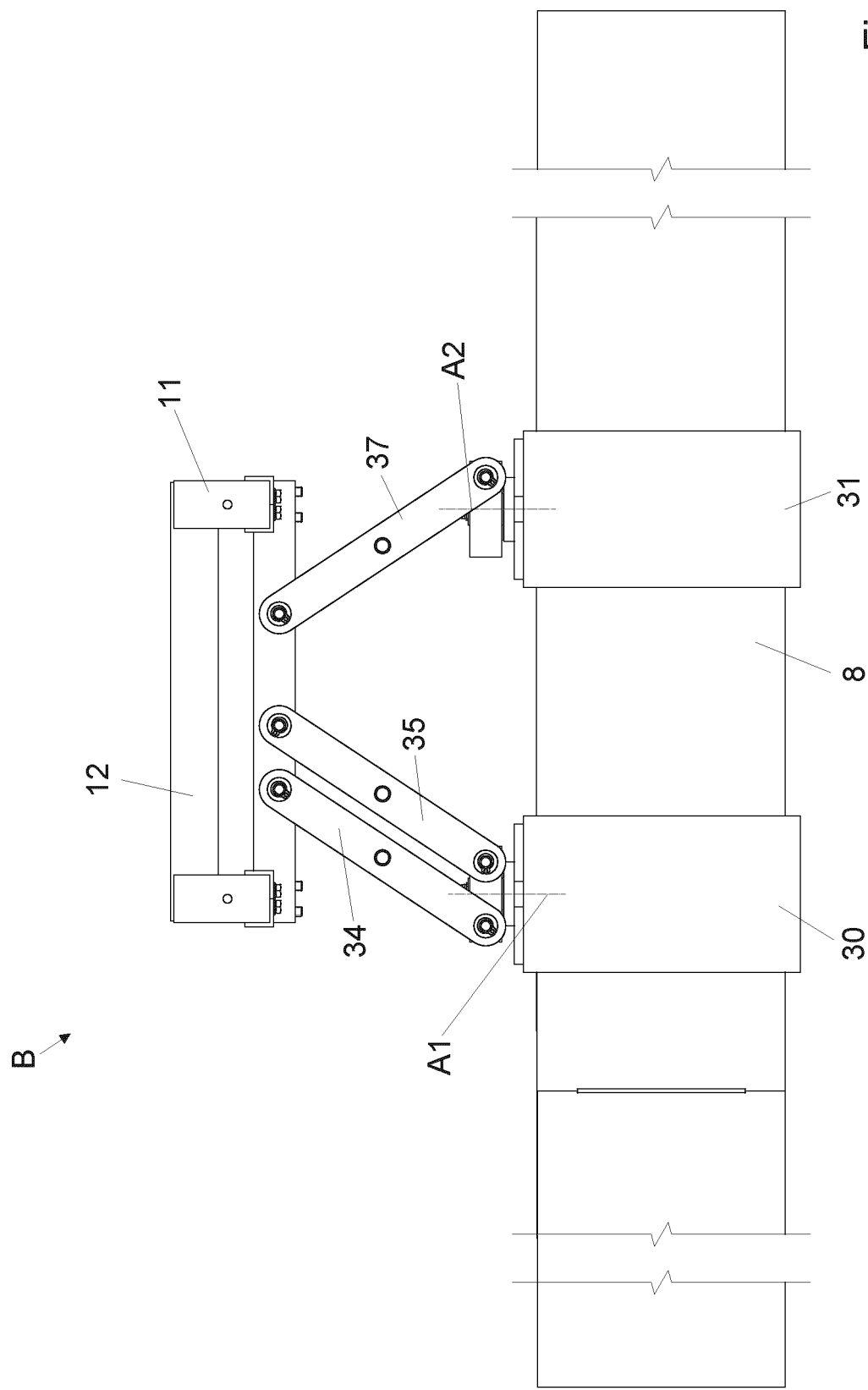

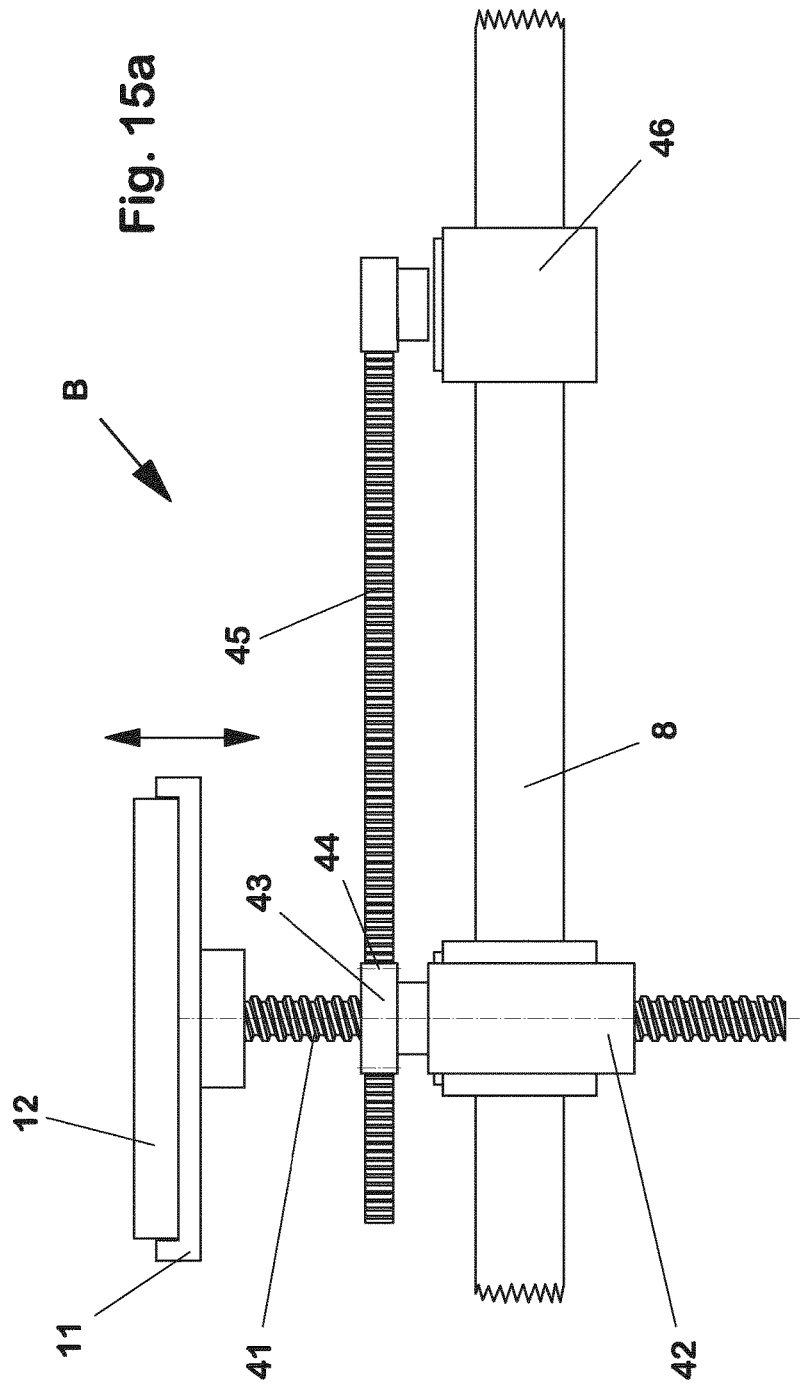

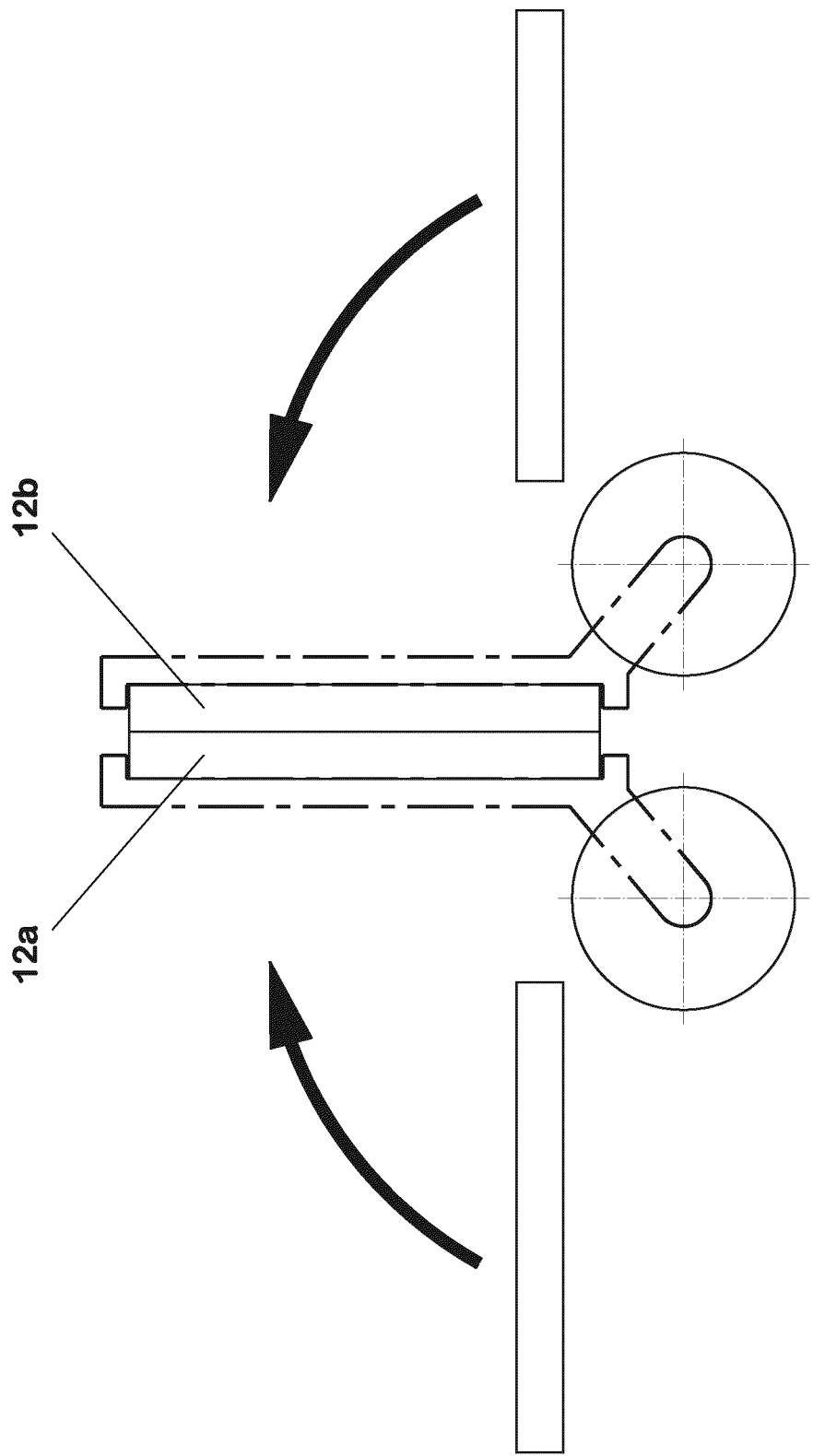

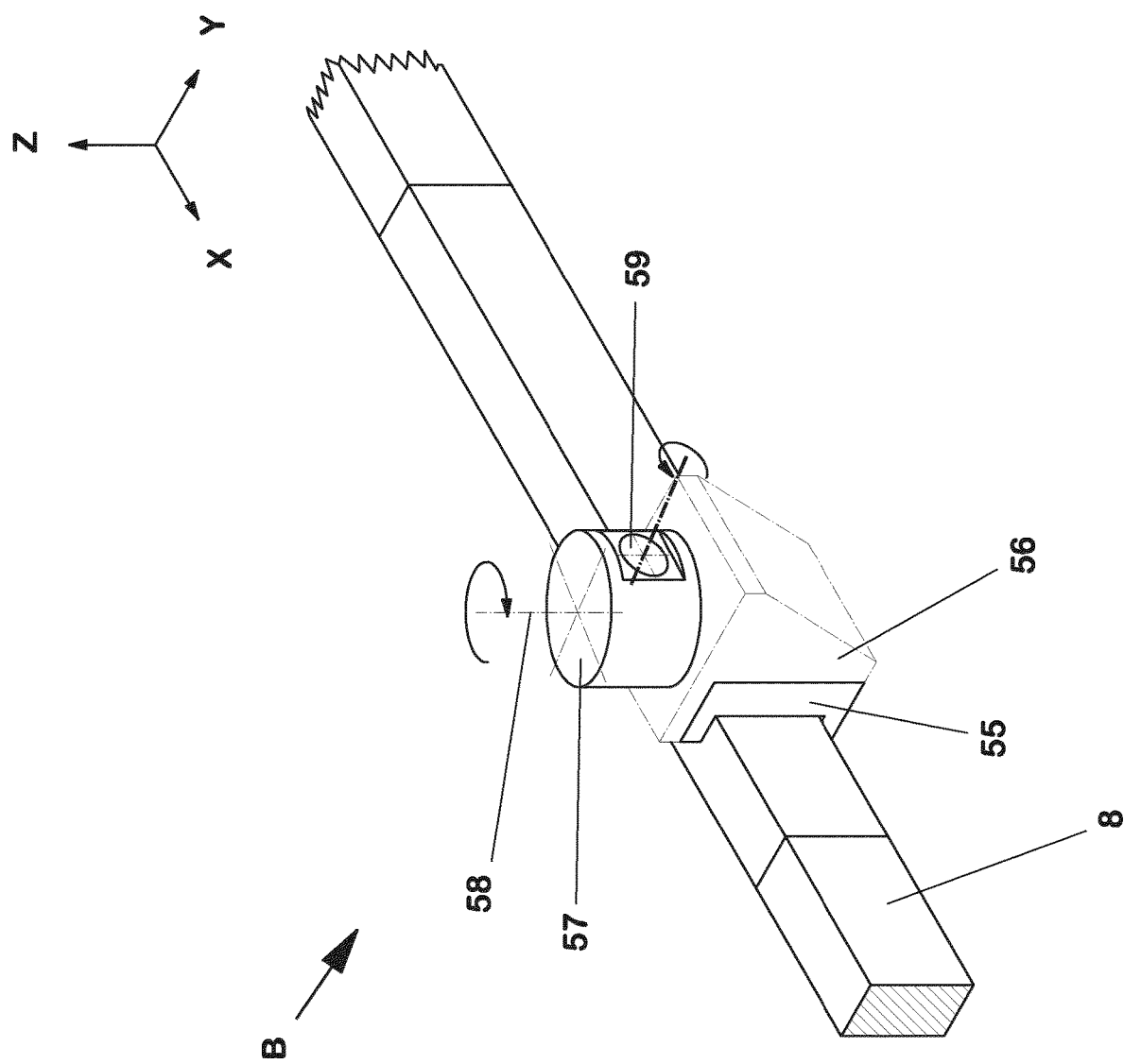

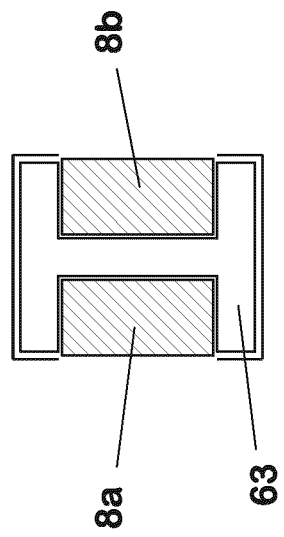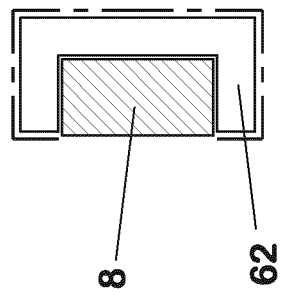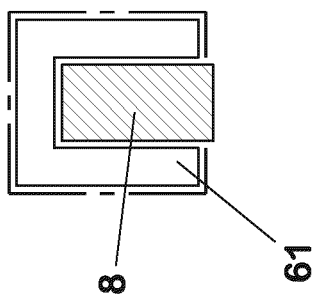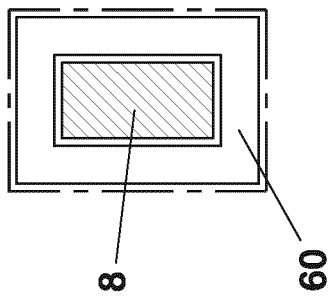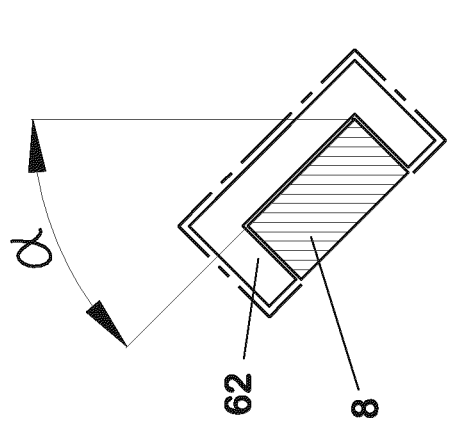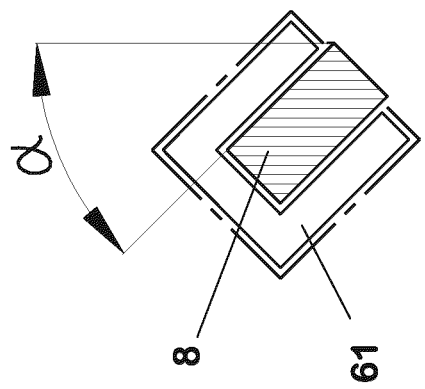

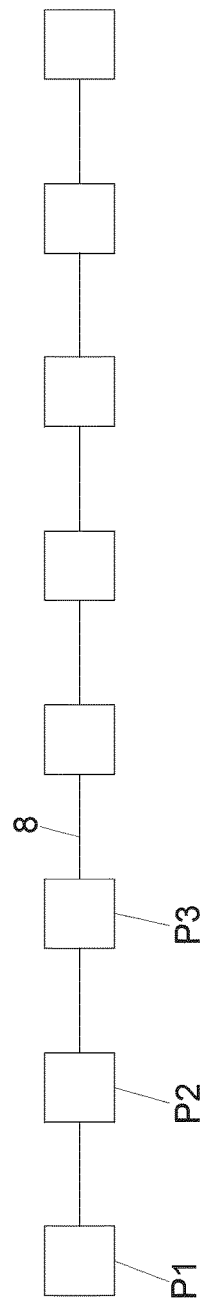
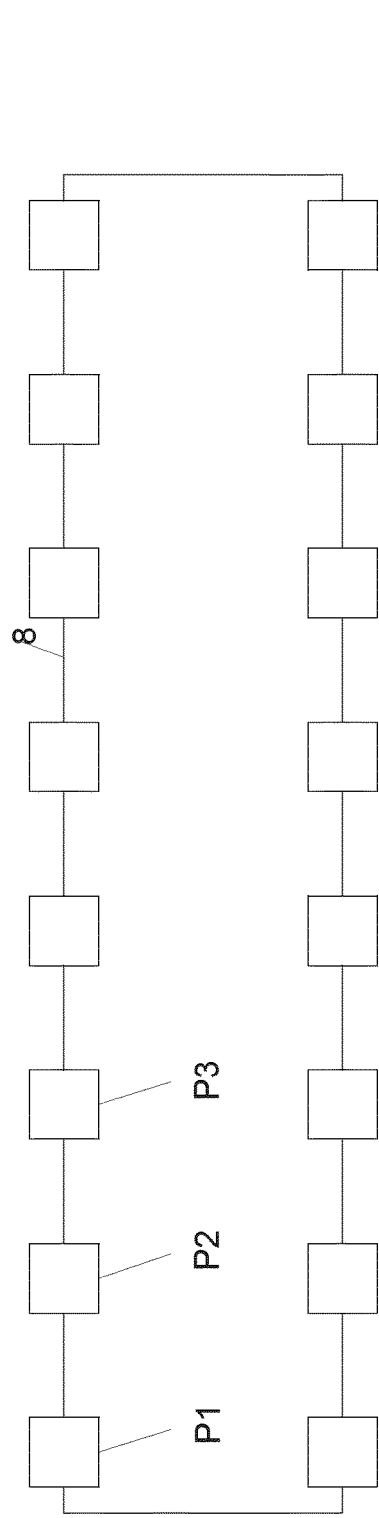
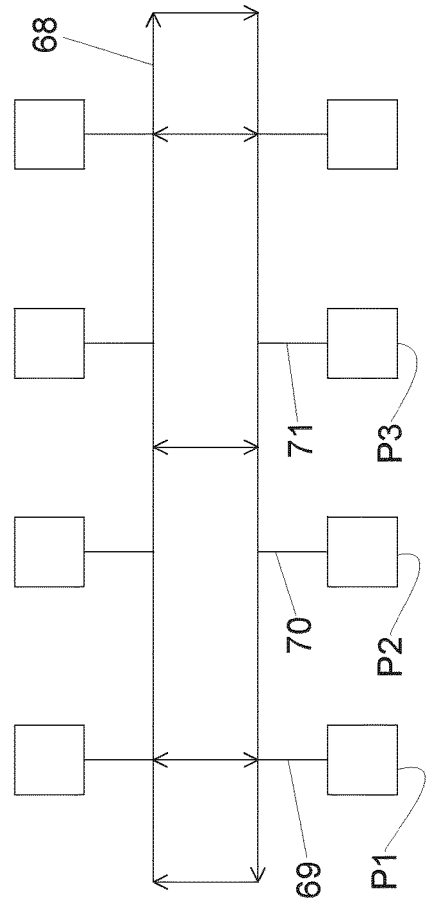

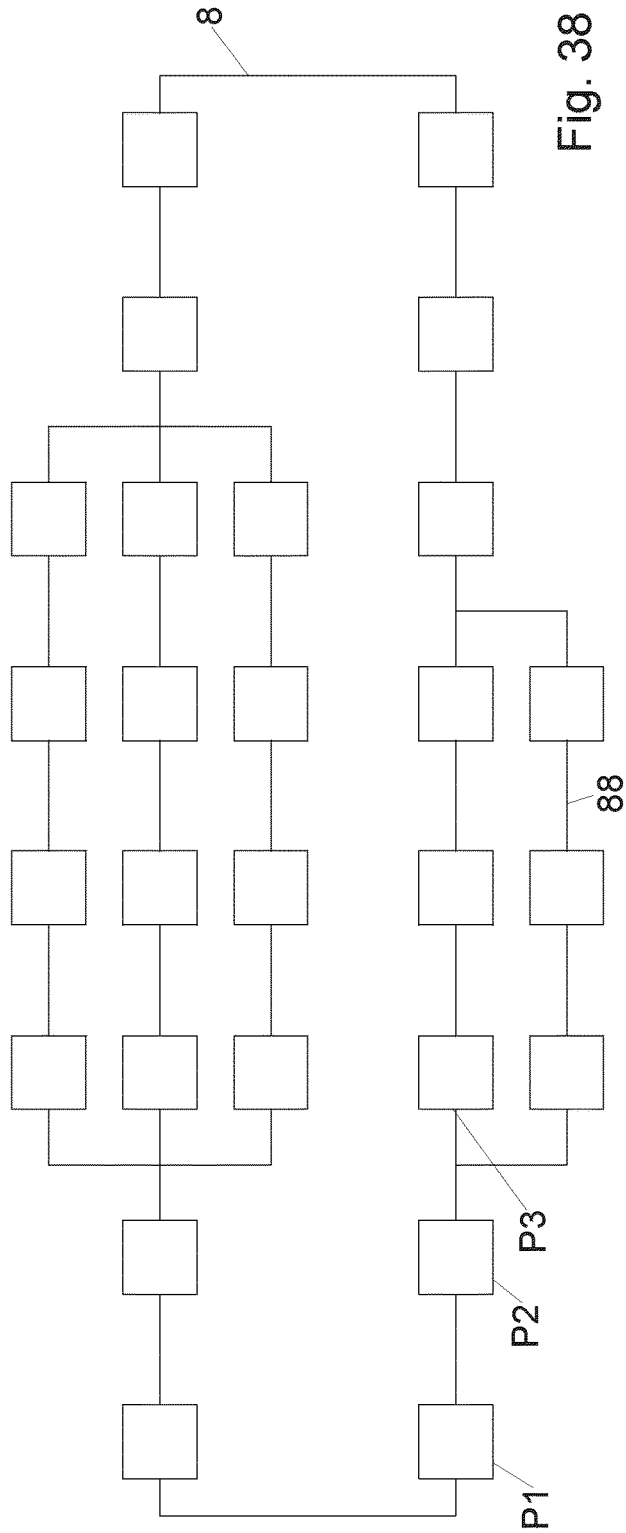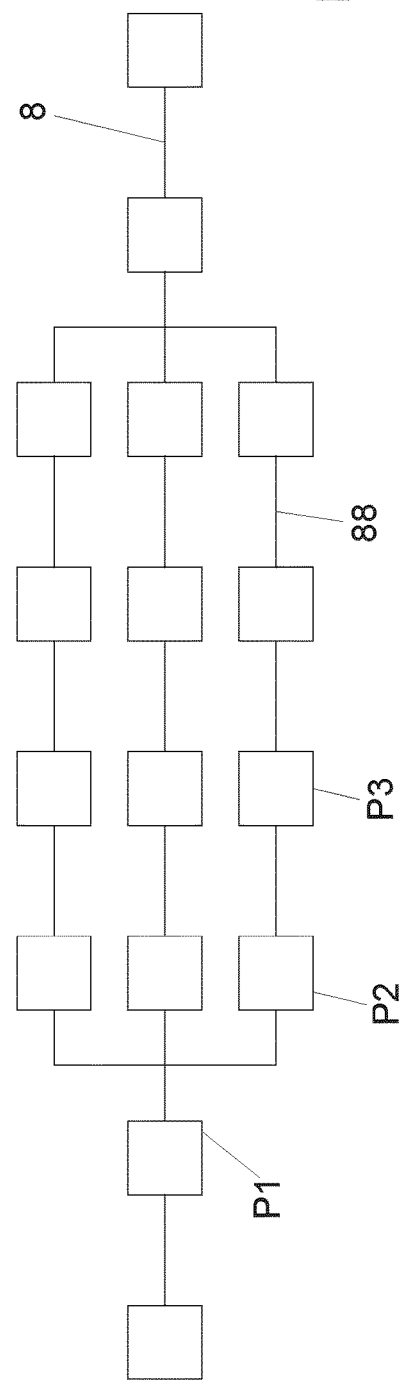

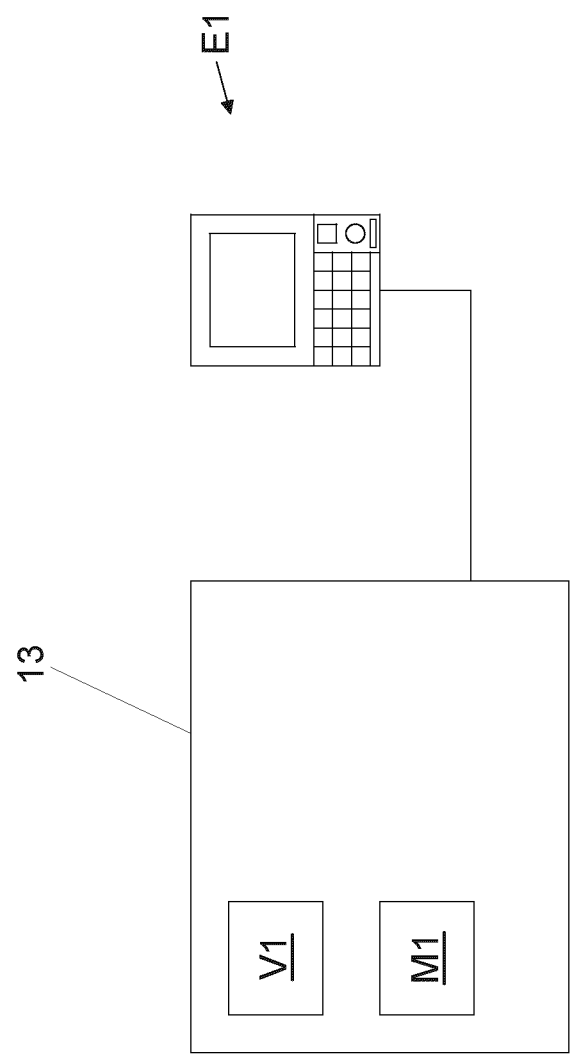

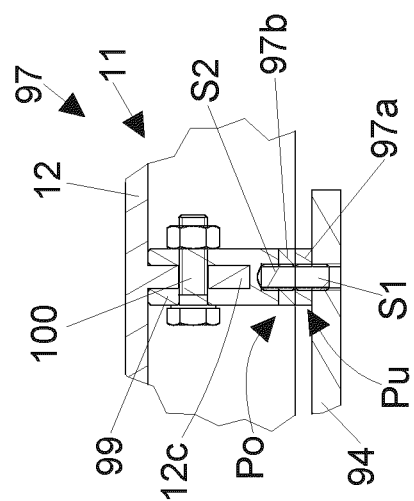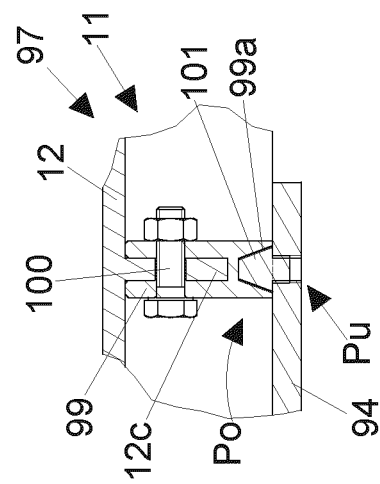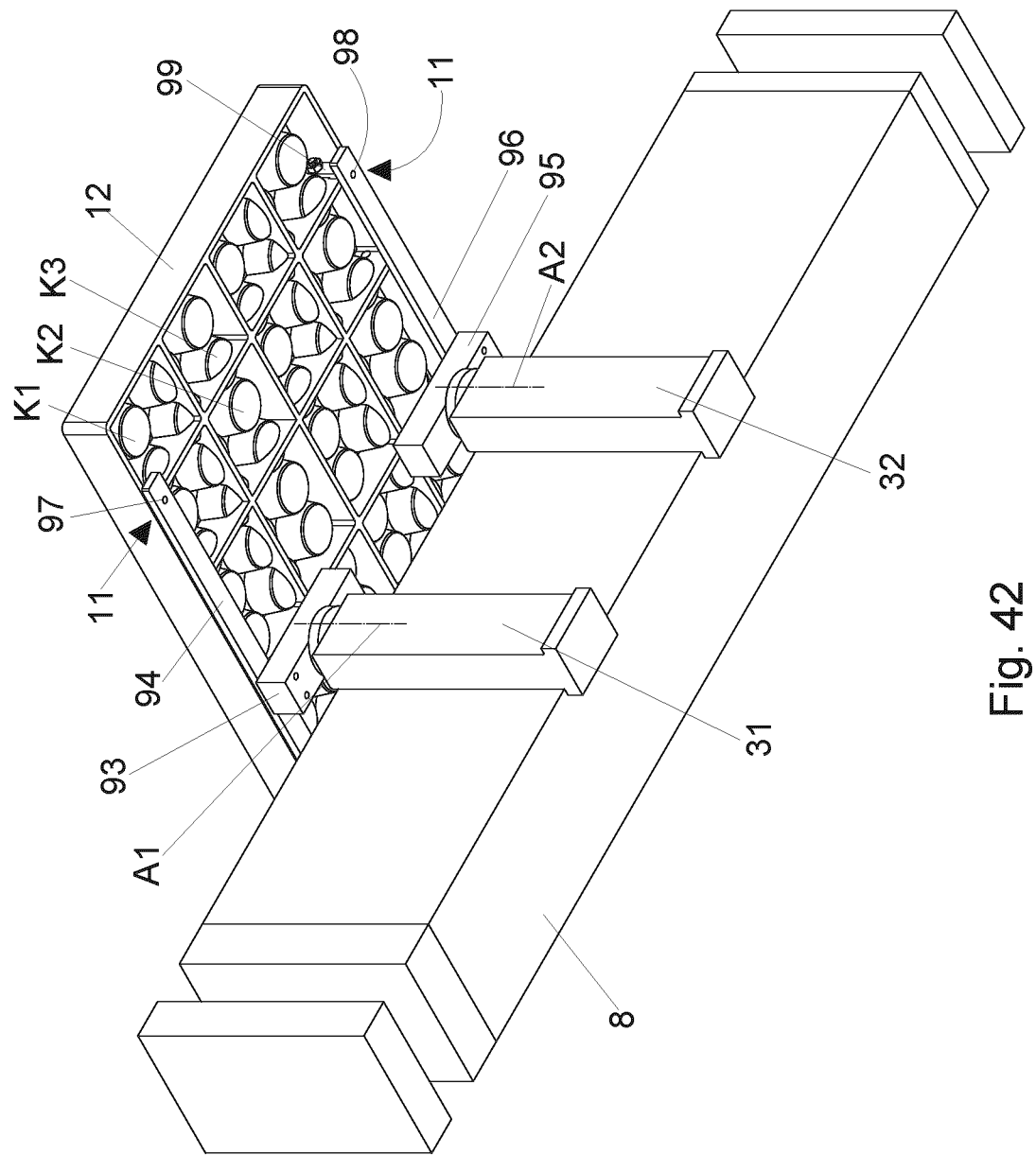

TRANSPORT SYSTEM FOR AN INDUSTRIAL CONFECTIONERY MACHINE

The invention concerns a transport system for molds of an industrial confectionery machine which comprises a plurality of production stations and molds for producing at least one confectionery article, wherein a mold can be transported to the respective production stations of the confectionery machine for successive production steps, including a transport rail and a drive device with which a transport movement for the respective mold can be produced to transport the mold along the transport rail to the production stations.

It is already known in the technical field of industrial confectionery machines to provide a plurality of production stations through which molds can pass, for example a casting station, a shaker station for the distribution of confectionery material in a cavity of the mold and/or for the removal of air bubbles from the confectionery material, a shaping station for shells, a cooling station, a turning station for preparation for shaping of confectionery articles, a station for mold cleaning, a magazine station and so forth.

A transport system without a transport rail has already been proposed in the technical field of industrial confectionery machines, which uses industrial robots of an articulated arm structural configuration with gripping elements, or also a system with transport carriages with their own drive which are intended to be moveable along track elements, but with the disadvantage that the track has to be converted for a changed production procedure. The gripping element of the industrial robot is intended to be capable of gripping individual molds and lifting them to surrounding production stations, depositing them there and removing them again, as shown in EP 3 111 768 A1.

A transport system for an industrial confectionery machine is time-honored and of the general kind set forth, with which molds can be guided in a row on so-called parallel guide rails. Such a transport system is to be found for example in patent specification DE 725 504. In that railbound transport system, it provides molds which are referred to as carrier plates and which are provided with pins on both sides. A respective conveyor chain is provided on both sides of the row of molds. Pins are provided on the conveyor chain as entrainment means for the mold, which cooperate with the pins of the mold and in that way provide for transport along the guide rails.

The principle of transporting molds by means of a conveyor chain along guide rails has been preserved hitherto. It is still being used for new industrial machines for confectionery manufacture. For hygiene reasons however a search has long been carried on for a better alternative because conveyor chains require lubricants which it would be desirable to avoid in foodstuff production. In addition, conveyor chains become contaminated with confectionery material and it is impossible for them to be one hundred percent cleaned again.

In addition, the principle of using the conveyor chain entails the point that the size/length of a mold, measured in the transport direction, always has to be matched to the pitch division of the conveyor chain.

In addition, there are limitations in regard to the extent of individual production stations in the transport direction because the dimension of the production station also has to be matched to the chain pitch division of the conveyor chain.

Particular disadvantages arise when an industrial machine for confectionery production is in the form of an endlessly circulating installation. The individual production stations require different periods of time for their respective production step. Basically the slowest production station determines the productivity of the confectionery machine. In the case of a transport system with conveyor chains there are necessarily free transport sections between individual production stations, and no production step is implemented in the region of such free sections. The free transport section is generally equipped, without a gap, with a mold at each possible position although no production step takes place between production stations which are far apart. Gaps in the row of the molds are to be avoided because a following production station would otherwise have to wait too long for the next mold.

In transport systems with conveyor chains the attempt is therefore made to adapt the production steps of many different production stations to each other. In that way the aim is for working phases within the production stations and transport phases between the production stations to be matched to each other. Individual production stations are then often operated with less advantageous parameters, and the production step in question is transitioned for example more quickly or more slowly than is actually required.

The object of the invention is to develop a railbound transport system in such a way that individual production stations can be more effectively put to use and free transport sections on which no production step would be effected can be reduced.

According to the invention that object is attained in that the drive device has at least one rail-guided carriage element, that the carriage element can be coupled to the transport rail and is drivable individually along the transport rail, that provided on the carriage element is a receiving device with which at least one mold can be received, that there is provided a control device, by means of which a main movement for the carriage element together with the receiving device of the mold can be produced along the transport rail in the transport direction to the respective production stations, and that in addition by means of the control device an auxiliary movement can be additionally transmitted into the receiving device in order to suitably move the mold for the respective production step.

Directional details hereinafter are based on a coordinate system in which the transport rail is oriented in the X-direction/axis/coordinate. The Y-axis is horizontal and at a right angle to the transport rail. The Z-axis is arranged at a right angle both to the X-axis and also at a right-angle to the Y-axis, as the third.

The transport system proposed is not restricted to the transport of molds or articles in the field of confectionery but is suitable generally for transporting molds for moldable materials like for example materials which contain pharmaceutical agents or materials which contain nutrition supplements and so forth. The molds can be of any design configuration which is suitable for molding confectionery materials or for molding materials with pharmaceutical agents or materials with nutrition supplements.

The auxiliary movement is so-to-speak a process movement which has to be carried out for the production step in the respective production station. In the simplest form the process movement can take place in the direction of the transport rail and superimposed on the main movement. An example of this is when the receiving device is to be moved to and fro along the transport rail in order to produce a process movement which is a shaking movement. A shaking movement can be used for example to uniformly distribute confectionery material. A shaking movement is also desirable when the situation involves allowing air bubbles to escape. Another example is a band molding movement in which the mold/receiving device is also moved during the molding operation along the transport rail within a molding station during the molding operation in order to create a confectionery article using a band molding method. The mold is thereby moved along beneath a molding nozzle of the molding station while confectionery material is fed in metered fashion out of the nozzle so that an article in a band form is produced.

The proposed measure dispenses with a rigid conveyor chain which passes through a plurality of production stations. The new transport system, by virtue of that measure, affords a size dependency between the mold and the chain pitch division of a conveyor chain. Likewise the size dependency is created between individual production stations relative to that chain pitch.

The carriage element can be moved independently along the transport system rail. Successive carriage elements are basically independent of each other in terms of their acceleration and speed. As required the movement of two or more carriage elements however can also be synchronized.

With the new transport system for industrial confectionery machines it is possible to considerably reduce free transport sections, on which no production step is carried out. It is no longer necessary to keep a transport section fitted with a series of molds without any gap in order to transport molds to a subsequent production station as far as possible without any interruption. The carriage elements can individually accelerate each mold and move them to the next production station at a sufficient speed.

The novel transport system makes it possible in that way to increase the effectiveness of a confectionery machine. Each individual production station can be better adapted to capacity requirements. The production capacity is no longer influenced by the production capacity of an adjacent production station. The dimension of the production station is independent of a chain pitch.

It is particularly useful if the carriage element is provided with an additional movement device which can contribute to implementation of the auxiliary movement of the mold and the movement device is arranged between the carriage element and the receiving device for the mold. Preferably then the auxiliary movement has at least one movement component in another direction from the main movement which takes place in the direction of the transport rail.

An auxiliary movement can be a composite movement. It can involve a plurality of movement components. In that case a movement component can be in the direction of the transport rail. In addition, a movement component or a plurality of movement components can be in another direction in order in that way to implement the respective process movement which is wanted in a production station. Desirably the movement device for the auxiliary movement of the mold is designed to be able to perform a lifting and lowering movement of the receiving device and/or in relation to the main movement to provide a lateral left/right mobility of the receiving device and/or is adapted for rotatability/pivotability of the receiving device. The auxiliary movement can therefore be a movement which is composed of a plurality of movement components/a superimposed movement.

The process movement can advantageously be such that sloshing of confectionery material during transport of a mold is counteracted, in particular it is possible to counteract confectionery material being sloshed out of the mold. Preferably that is effected by appropriate inclined positioning of the receiving device during an acceleration phase and subsequent movement.

In a shell shaping station which provides a ram to impart a configuration to flowable confectionery material in a mold a process movement is required so that the ram can displace confectionery material within the mold. To perform that operation of flow pressing the ram is preferably arranged stationarily in the production station. The mold in turn then preferably performs the required process movement relative to the stationary ram. Essentially the process movement is a lift movement (Z-axis). For a ram procedure, such a shaping station requires a certain time in which the mold remains in the shaping station and the process movement can be performed. A flowable melt has to be able to cool down and solidify during the ram procedure to such an extent that it remains stable in shape after subsequent release of the ram from the mold. Because shaping of the confectionery material takes place while the mold is stationary the period of time for which the mold is stationary has to be adapted to the required residence time that the ram requires for solidifying the confectionery material. The period of time from transporting a mold to the station to transporting the following mold thereto is basically referred to as the cycle time, more specifically the period of time required for carrying out the working operation. To achieve a high production output in principle short cycle times are wanted and the endeavor is to achieve a high cycle frequency. A cycle frequency however may not be so short such that the residence time of the ram is too short in order to allow the melt to sufficiently cool down and solidify.

To give such a shaping station sufficient time for the ram pressing operation it is known for a mold upon transport thereof to be conveyed at an accelerated pace towards the shaping station to gain time so that the mold can be left for a greater time within the shaping station in order to carry out the shaping process without any problem and to solidify the melt sufficiently such that it is stable in respect of shape when the ram and the mold are separated from each other again. Hitherto an additional device was to be integrated in the transport system in order to move a mold or even a plurality of molds at an accelerated pace into the shaping station and to give it more time there for a ram operation. With the proposed measure the rail-guided carriage element can be coupled to the transport rail itself and driven individually along the transport rail at an accelerated pace it can give a time advantage which can be used in the shaping station to carry out the operation of flow pressing the melt at a suitable speed and with a sufficient period of time for cooling of the melt.

With the transport system according to the invention it is possible to set an exact ram depth within a shaping station operating with a cooled ram in order in that way to achieve a good and uniform implementation of the shell edge. Alternatively, the ram depth can also be limited by an abutment which limits the relative movement of the ram into the cavity of a mold.

An alternative shaping station for shells of confectionery material is a so-called tumbling station which operates without a ram. For the so-called tumbling method for the purposes of forming an open shell the cavities of a mold are filled with confectionery material in a molding station and appropriately also fed to a shaking station prior to the tumbling operation. Firstly, the mold is turned through 180° and then the tumbling station displaces the mold in a tumbling movement composed of vertical, horizontal and circular movements. In that situation, excess confectionery material flows out of the cavities into a catch container arranged beneath the tumbling station. Confectionery material which has already set remains clinging to the inside walls of the cavities and is intended to form a confectionery shell which is as uniform as possible. After the tumbling operation the mold is turned through 180° about a longitudinal axis back into its original position. The transport system according to the invention is suitable for the production of shells from confectionery material both by means of a shaping station which operates with a cooled ram and also for the production of confectionery shells by means of a tumbling station.

Furthermore, the transport system can usefully cooperate with a wiping-off station or equally usefully with a lick-off roller.

A lick-off roller can be used, for example, after the production step which shapes confectionery material to constitute a shell. If the confectionery shell, for example, is to be shaped by a ram method then a certain excess of confectionery material is meteredly introduced into the mold for carrying out the shaping ram process. This ensures that at the end of the shaping operation excess confectionery material always issues at the edge of the mold. The shell edge then has too much confectionery material so that the excess confectionery material can be removed by means of a lick-off roller and in that way a defined shell edge can be produced at the same time.

A wipe-off station is used, for example, after a molding station to apply a top or lid material to a filling. In this case, the top material is intended to cover the entire filling and to be joined to the confectionery shell at the edge thereof. An excess of confectionery material is usually also molded to produce a cover. Then a wiper blade is passed over the top side of the mold to distribute the casting material or to spread the confectionery material to make it smooth, that is to form the top. The excess of confectionery material is pushed away over the top side of the mold and removed.

With the proposed transport system the mold can be both lifted in the direction of a lick-off roller for the purposes of licking away a shell edge and can also be lifted against a wiper blade when the situation involves removing top material and providing a smooth top surface.

A shaker station is of use for distributing confectionery material in a mold and/or for removing air bubbles from the confectionery material. It can be in the form of horizontal shaking. The auxiliary movement or the process movement is then a shaking movement which can take place parallel to the transport movement (X-axis) or laterally relative to the transport movement in the same plane (Y-axis). Alternatively, the shaking movement can be implemented in a direction perpendicular to the transport plane of the mold (vertically) (Z-axis). A mixing movement is also possible horizontally/vertically, which has components in the direction of the X- and/or Y-plus Z-axis.

In a turning station a mold is moveable about an axis, for example being rotated about a transverse axis. That is required, for example, for a demolding station which definitively removes finished confectionery articles from the mold. Equally a mold provided for a tumbling station has to be turned through 180° at the beginning and at the end of a shell-forming tumbling operation to empty excess confectionary melt.

In addition, there are confectionery articles which are produced in so-called double molds comprising two mold portions. In the production of such double mold products, there is a closing station with which the mold (double mold) comprising the two mold portions are placed against each other to obtain a closed mold cavity. At least one of two mold portions has to be rotated for that purpose. In the case of a two-part mold each mold portion can be moveable in a condition of being held by a receiving device with a carriage element, wherein the additional movement device can position the respective mold portion in such a way that it forms a hollow mold with the complementary mold portion.

An empty mold can be cleaned in a cleaning station. Preferably, the empty mold is firstly turned upside down in the turning station so that its empty cavities are open downwardly. The cleaning operation is then desirably effected by means of a cleaning roller and/or a cleaning blade from below. In addition, percussion hammers can be used for the cleaning operation, preferably in order to detach residues of confectionery material from a mold which is upside down, and to cause the residues to drop down.

To produce the auxiliary movement there can be provided on the carriage element a specific motion means which includes a drive which is designed for that purpose and with which the auxiliary movement of the receiving means can be produced.

Desirably the receiving means is combined with at least two carriage elements and at least one of the two carriage elements is drivable for the purposes of producing the main movement.

Advantageously, to produce the auxiliary movement of the mold, the movement device has at least one link chain consisting of bars, which link chain is telescopic or is in the form of a parallelogram guide arrangement, or is in the form of a link chain consisting of crossed bars in the manner of scissor levers of a scissor lift table. In that way in particular an auxiliary movement can be implemented in the form of a lift movement (Z-axis). The link chain however can also be arranged for a movement sideways relative to the transport direction (Y-axis).

Alternatively, at least one of the two carriage elements can be coupled to the movement device for producing the auxiliary movement. Thus the auxiliary movement is driven by means of a carriage element.

In a simple structure the link chain of the movement device can have a bar with a fixed joint and a moveable thrust bar, wherein either the moveable thrust bar is displaceable by means of a separate drive means or the thrust bar is displaceable by meas of one of two carriage elements.

As an alternative to a link chain a spindle drive, a system with inclined planes or a linear guide arrangement can be used.

The transport rail can be of a modular structure comprising straight and curved rail modules.

In addition, it is deemed to be highly helpful if the transport rail is enlarged to constitute a transport rail network which includes curves and/or switch devices and/or crossings. By means of a switch device and a transport rail arranged there beside it is possible for a carriage element to be passed from a main rail on to a secondary rail or back again therefrom on to the main rail. This can provide an overtaking section for molds or a transport rail can be in the form of a loop in order for example to transport a mold for a second production step back to a production station through which it has already previously passed and in which a first production step has already been effected.

A great advantage of the proposed transport system is that, in contrast to a confectionery machine with conventional conveyor chain transport systems it is no longer absolutely necessary to have to provide a multiple number of production stations of the same type. Thus with the novel transport system, for example, there can be a single molding station and the same mold can be transported a plurality of times to that molding station for the purposes of different production steps.

A molding station can be used for example for the production of a hollow body with filling for various production steps because a mold can be transported in that transport rail network afresh to the molding station to which it had already been previously transported for an earlier production step.

For a hollow body with filling it is possible in that way firstly for the confectionery material to be metered into the mold with which the shell is shaped. When the shell is later provided in the course of production with a filling, a top has finally to be molded on to the filling, which top is to be sealingly joined to the shell edge and preferably comprises the identical confectionery material from which the shell is also produced. With the proposed transport system, for the purposes of molding the top, it is possible to use the same molding station for a second production step in the production of a confectionery article. Unlike the situation with a confectionery machine having a conveyor chain there is no need to provide a second molding station for molding the top. By virtue of the novel transport system the confectionery machine can be of a markedly more compact structure. Each individual production station can thereby be used more efficiently.

A turning station can also be used a plurality of times so that it is possible to dispense with a second turning station. The novel transport system makes it possible to transport a mold for various production steps a plurality of times to the same turning station. A mold for example has to be turned when a confectionery article is finished and is to be removed from the mold. The mold for that purpose is turned upside down so that the confectionery article can drop downwardly out of the mold. In the further procedure the mold has to be turned back again, which can be effected by means of the proposed transport system in that the mold can be transported again to the same turning station with which it was previously turned upside down.

For other production stations which have to be provided in a multiple number in a conventional confectionery machine operated with a conveyor chain transport system it equally applies that with the novel transport system, a mold can be transported a plurality of times to a single production station in order to carry out different production steps therein. Thus by virtue of the proposed transport system the number of production stations overall can be reduced and each individual production station can be used more effectively.

In order to make the transport rail network effective, it is so designed that the production stations of the confectionery machine are suitably arranged relative to each other. For that purpose, different layouts are proposed for the transport rail network. It may involve a ring layout or a series layout, a bus layout, a star layout or hybrid forms of the above-mentioned like a bus-ring layout, a star-ring layout, a star-bus layout, a ring-parallel layout or series-parallel layout.

For individual drive of the carriage element along the transport rail, the arrangement may have an electric motor, wherein the electric motor can be arranged on the carriage element. Alternatively, the arrangement can have a linear motor in which the carriage element is in the form of the rotor and the transport rail is in the form of the stator, and with a means which is arranged on the carriage element and with which a rotor magnetic field can be generated and with a means provided on the transport rail with which a stator magnetic field can be generated.

It is also useful if the control device includes at least one processing unit (processor), wherein the processing unit is adapted to execute control software and to process information and the processing unit has at least one data memory associated therewith.

It is also useful if the data of all carriage elements disposed in the transport system can be processed in the processing unit and the rail element data include at least the position data of the carriage elements relative to the transport rail and/or speed data of the carriage elements relative to the transport rail and/or data which relate to which receiving device has a carriage element associated therewith.

A further advantage is that data concerning the mold can be processed in the processing unit, which data relate to information as to whether a mold has passed through or left a process step and/or to process-relevant data like the temperature of a mold or a period of time that the mold spent in a production step.

The transport system can further be improved if there is provided an input unit, by means of which it is possible to input into the control software, in what sequence a mold is to be transported to individual production stations and said sequence can be filed as a process plan in the data memory.

It is further desirable if at least one parameter set relating to a production step which the mold has passed through can be stored in the process plan for each mold.

Advantageously the transport rail is virtually imaged in the control software and process-relevant trigger points are provided along the transport rail, the real transport movement of a carriage element is also moved as a virtual carriage position point in the control software and a process can be activated under software control when a carriage position point reaches a trigger point.

The receiving device is also viewed as a separate invention which is such that it can be coupled to at least one carriage element.

Preferably the receiving device for the mold has a frame structure. Alternatively the receiving device can be in the form of a frameless support, in which case it then preferably has suitable positioning aids which prevent a mold from laterally slipping off or slipping down from the support. When the receiving device has a frame structure it can be for example rectangular or trapezoidal and can be suitable for receiving a mold. Desirably each receiving device is such that the top side of the mold is completely free.

In a preferred embodiment, the frame structure is substantially without a bottom floor, in which case the frame structure has support surfaces only at its corners or edges. There are provided at least two support surfaces for receiving the mold. The support surfaces can preferably be made from a plastic and screwed to the frame structure, glued thereto, or clamped in place thereon. The frame structure can also be formed in one piece with the support surface. The frame structure can comprise a plastic to save weight.

The support surface can be flat and/or can have raised portions. In the case of a flat support surface, the mold lies with its side edges against the respective corners of the frame structure. In that case, the frame structure embraces the mold in such a way that the mold is held in a fixed position. Alternatively, a raised portion can be provided on the support surface, that ensures that the mold is additionally supported and is not displaceable in the longitudinal and transverse directions. In that case, the mold is in engagement with the raised portions of the support surface. If the mold has transverse struts, the raised portions can be in contact between two transverse struts or can bear against side edges of the mold. Alternatively, the support surface has a magnet which interacts with a magnet arranged on the mold and holds the mold in position in the frame structure. In addition, the support surface can be arranged moveably relative to the frame structure, in particular it can be adapted to be moved up and down in relation to the transport direction.

In a preferred embodiment, the frame structure is not closed (is open) over its periphery. Preferably, the frame structure is open at its longitudinal edges, in which case the longitudinal edges of the frame structure preferably embrace ⅓ of the longitudinal edge of the mold. Particularly preferably, the longitudinal edges of the frame structure embrace less than ⅓ of the longitudinal edges of the mold.

The frame structure can be adapted to be variable in length and/or width to receive molds of differing sizes. For that purpose, the side edges of the frame structure can be arranged displaceably on a frame rail and can be latchable in a plurality of positions. A side edge of a frame structure for that purpose has notches for example at the underside, which come into latching engagement with a toothed rack disposed on an opposite side of the frame rail. Alternatively disposed on the frame rail are stop elements, for example in the form of plastic blocks, which secure the edges of the frame structure in a position. Alternatively, at least two parts of a side edge of a frame structure can be biased by way of a spring, in which case when the side edges are pressed out a mold can be fitted into the frame structure while when the side edges are pressed in the mold can be clamped between the side edges and/or the support surface and the mold.

Figure 2:
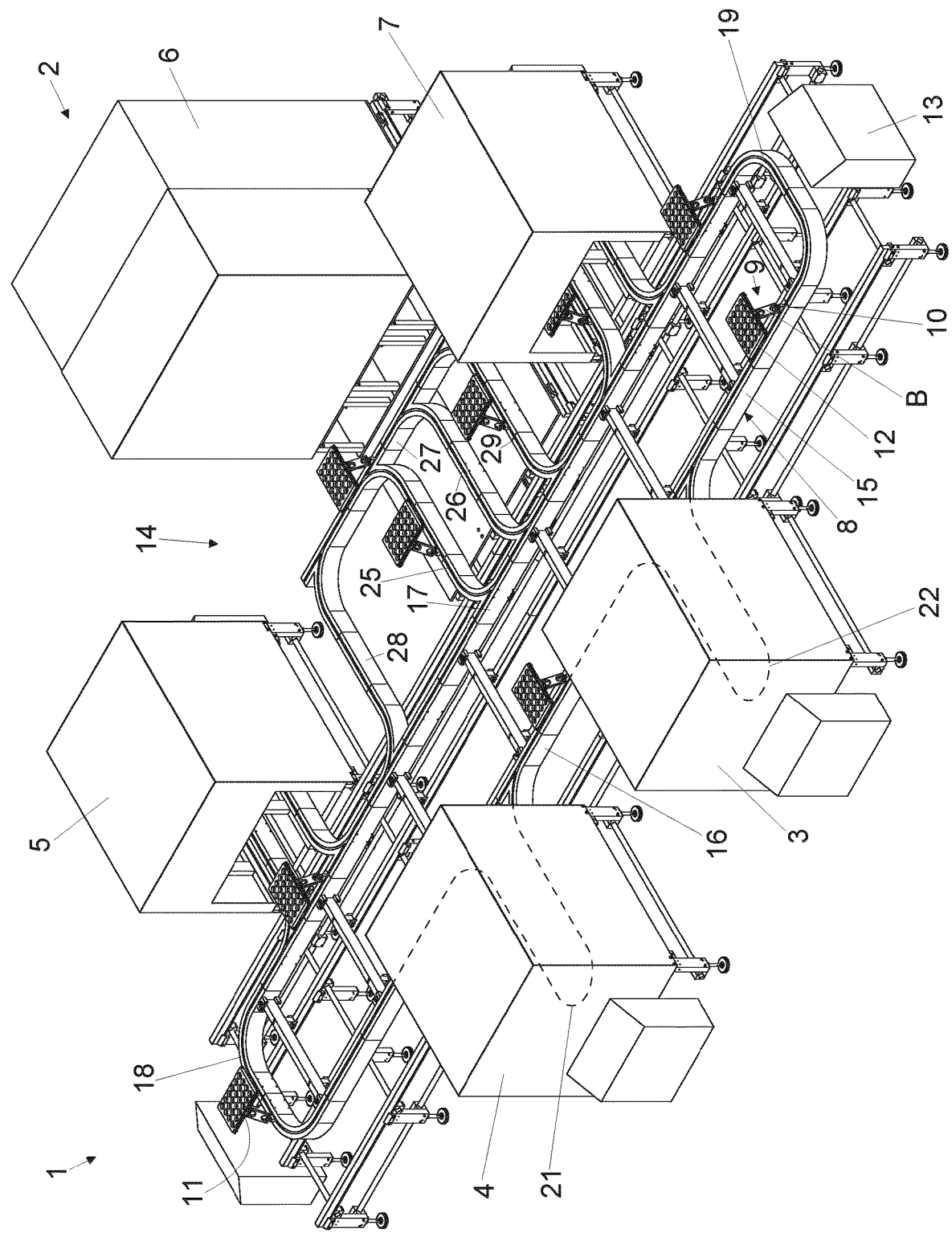
Figure 3:
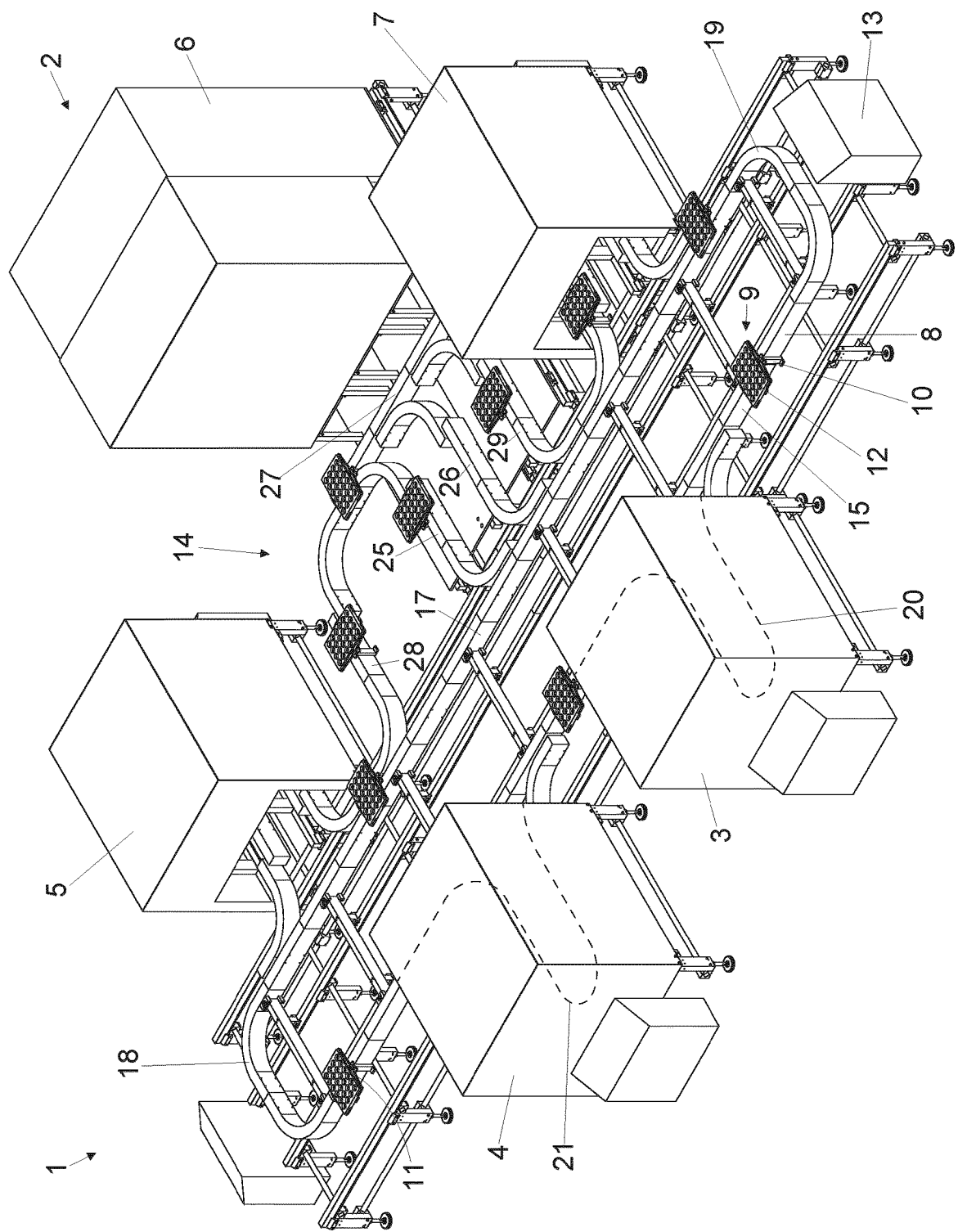
Figure 4:
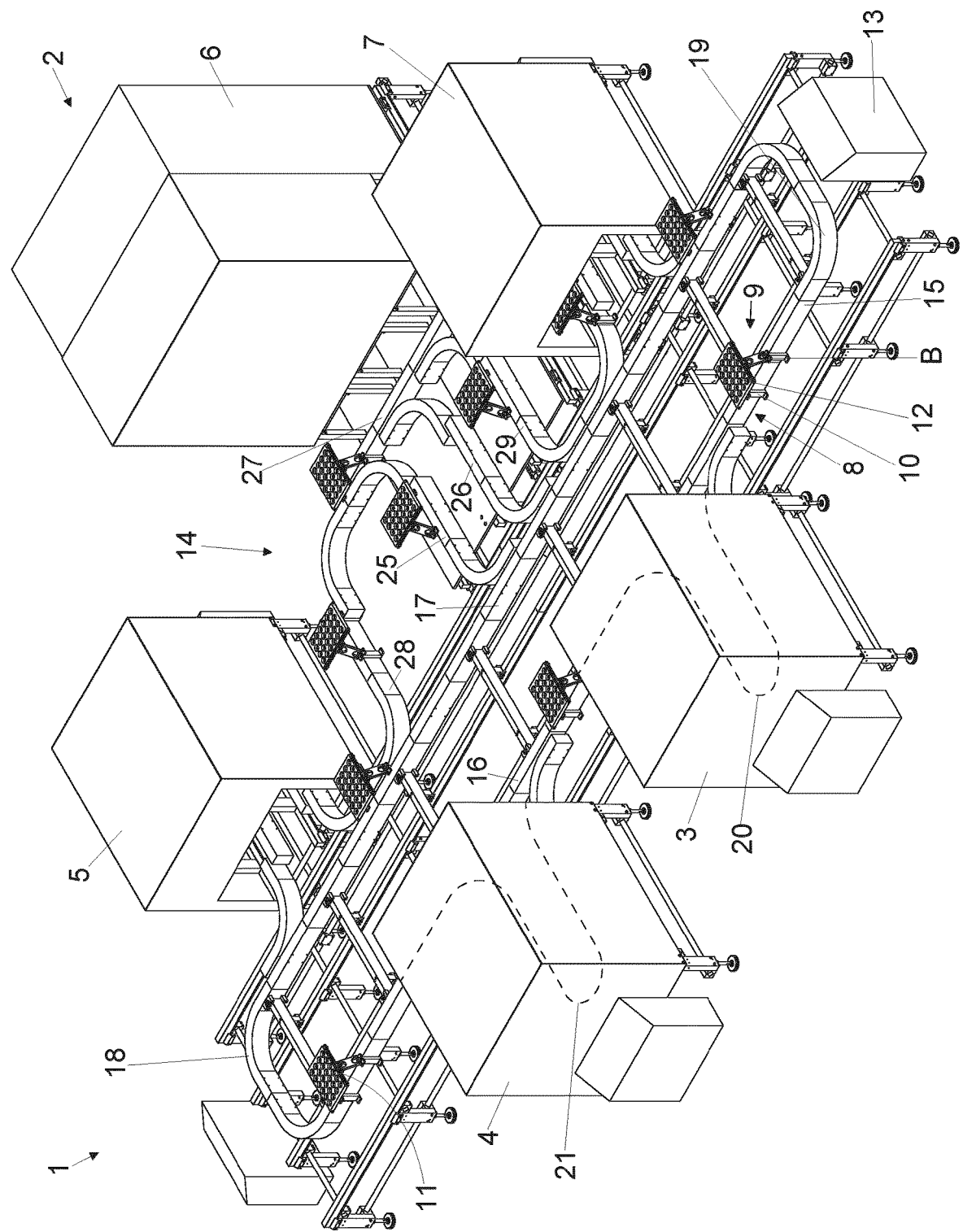
Figure 7B:
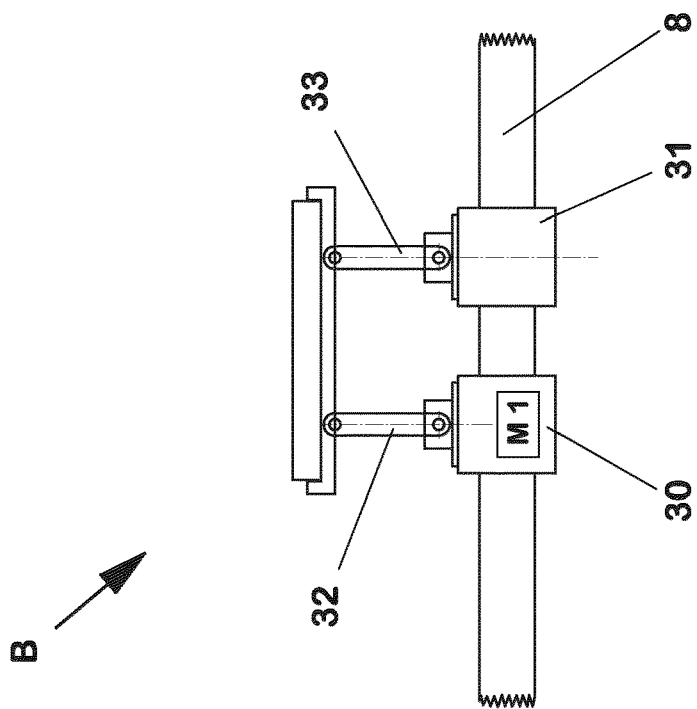
Figure 7A:
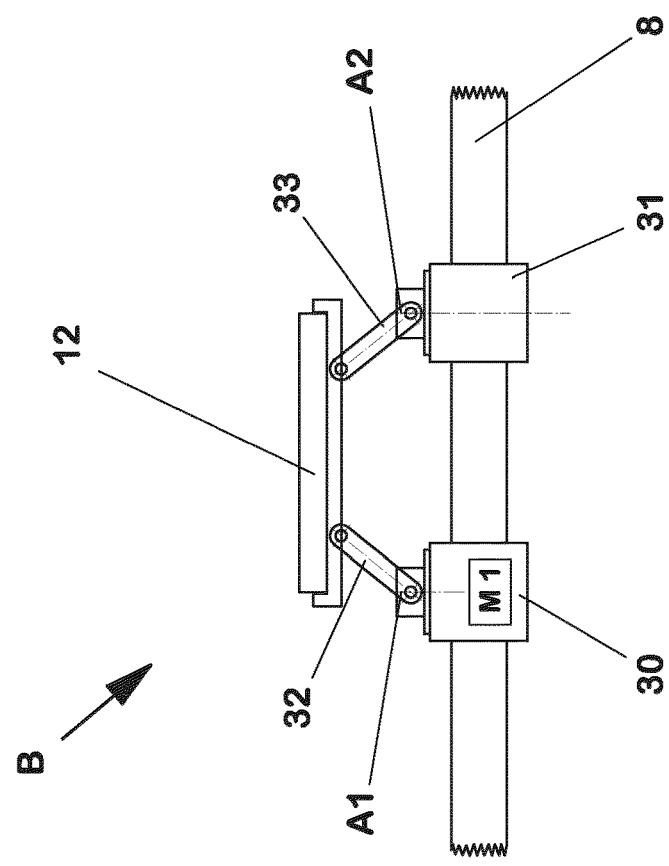
Figure 13B:
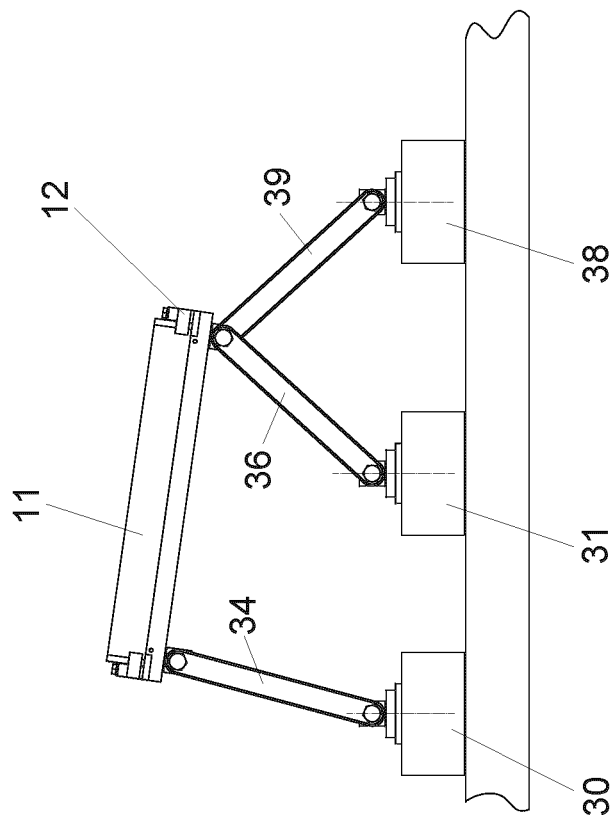
Figure 13A:
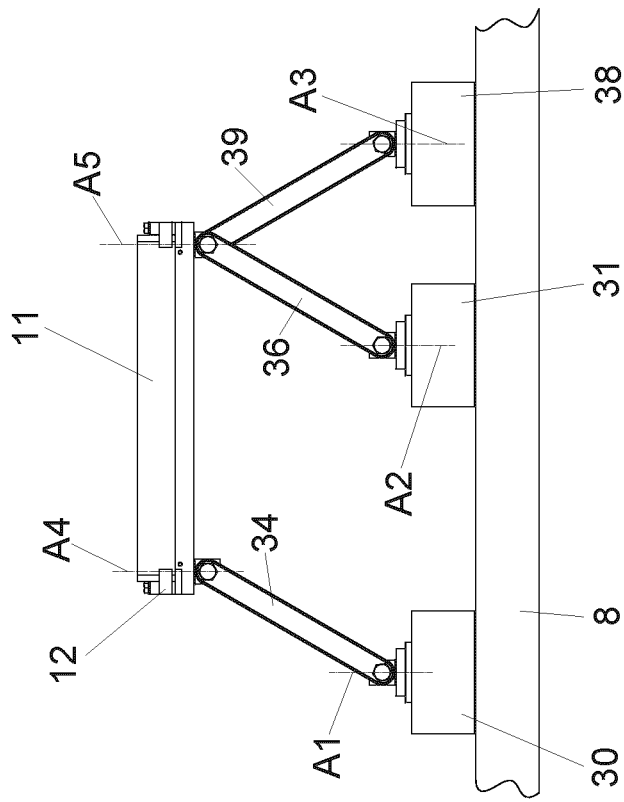
Figure 14B:
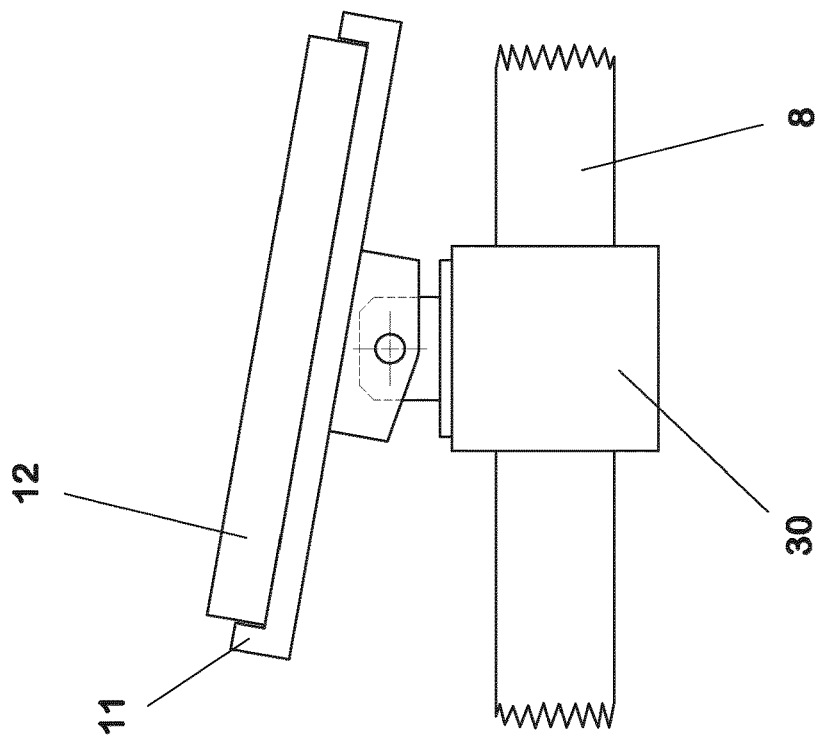
Figure 14A:
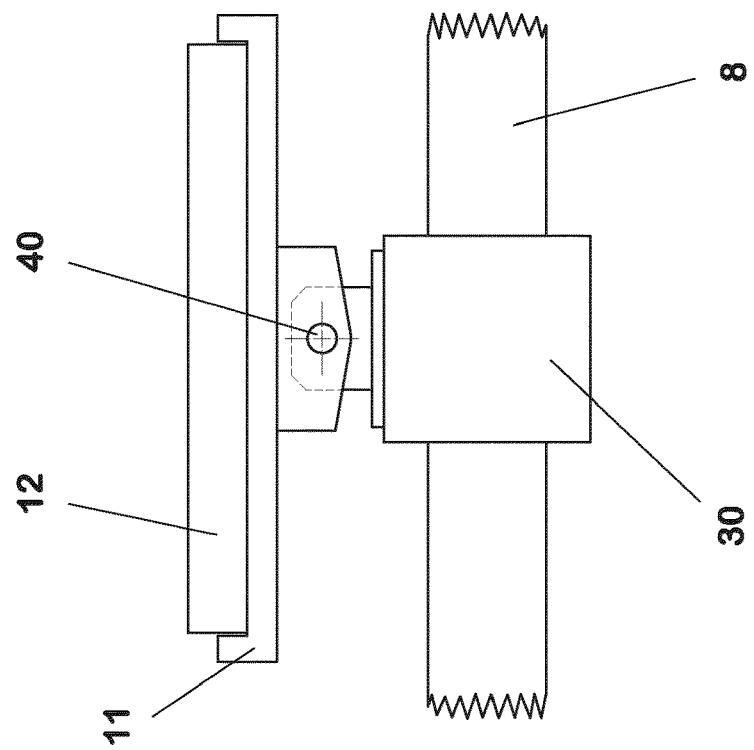
Figure 16:
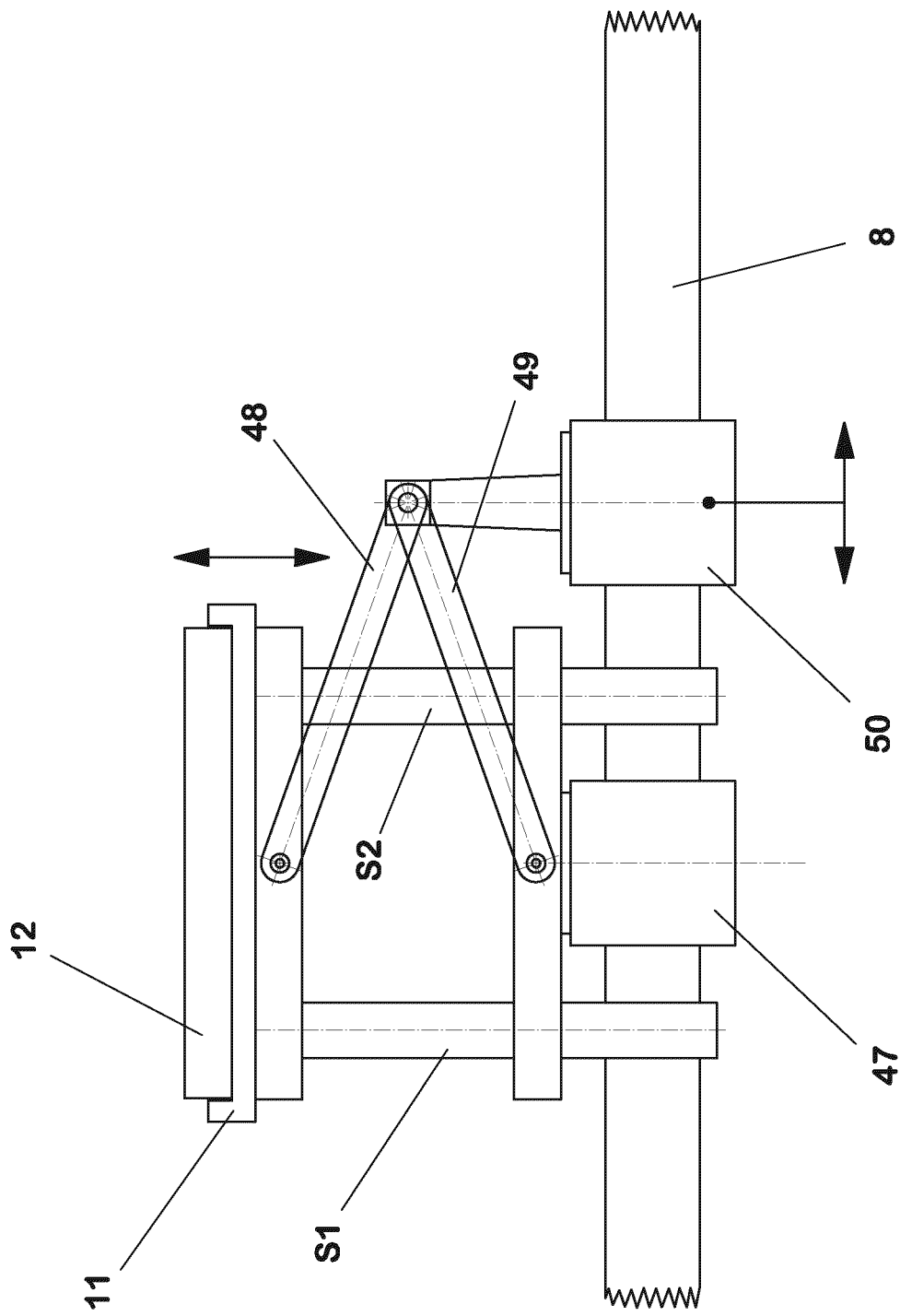
Figure 17:
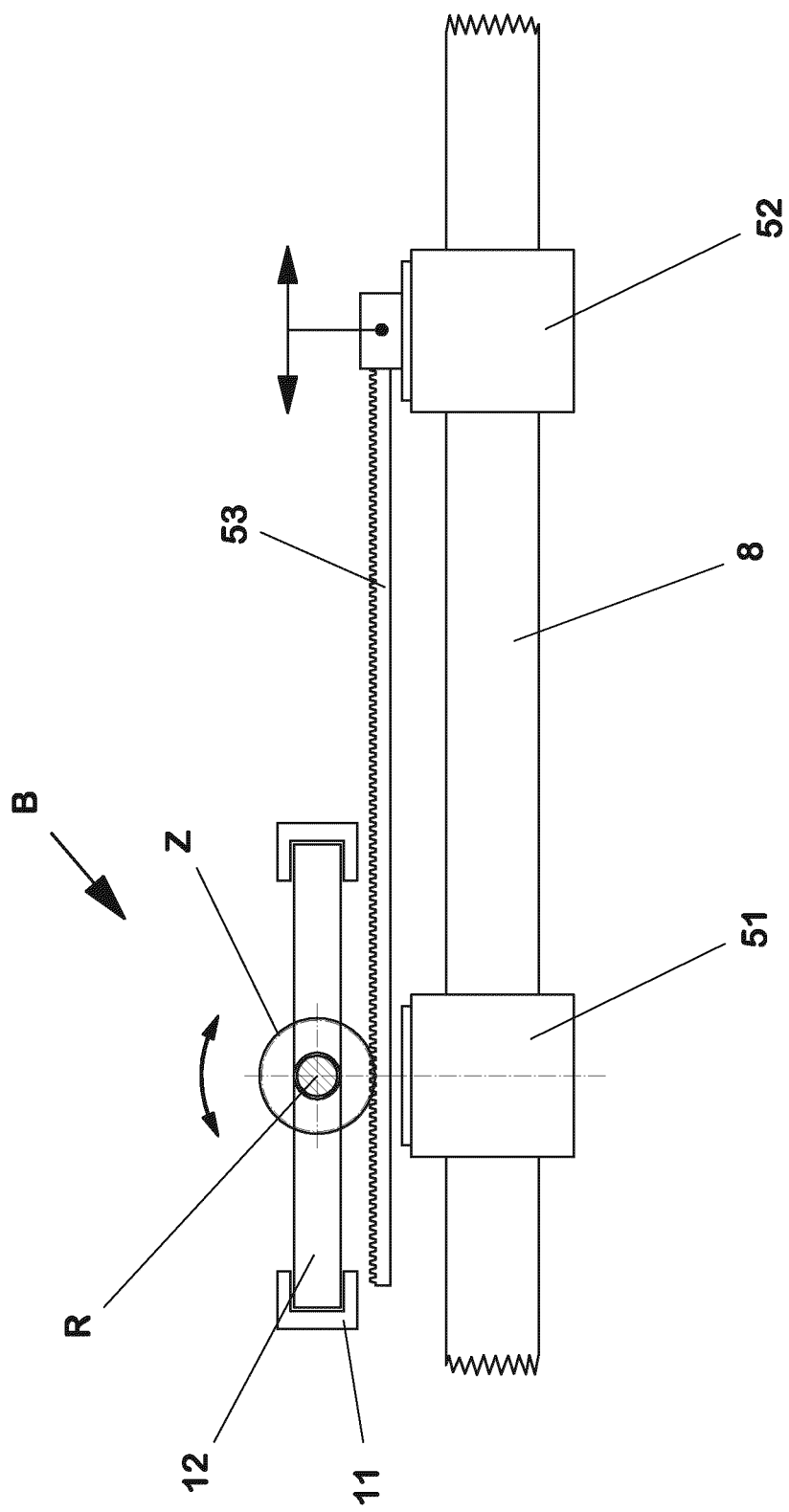
Figure 26:
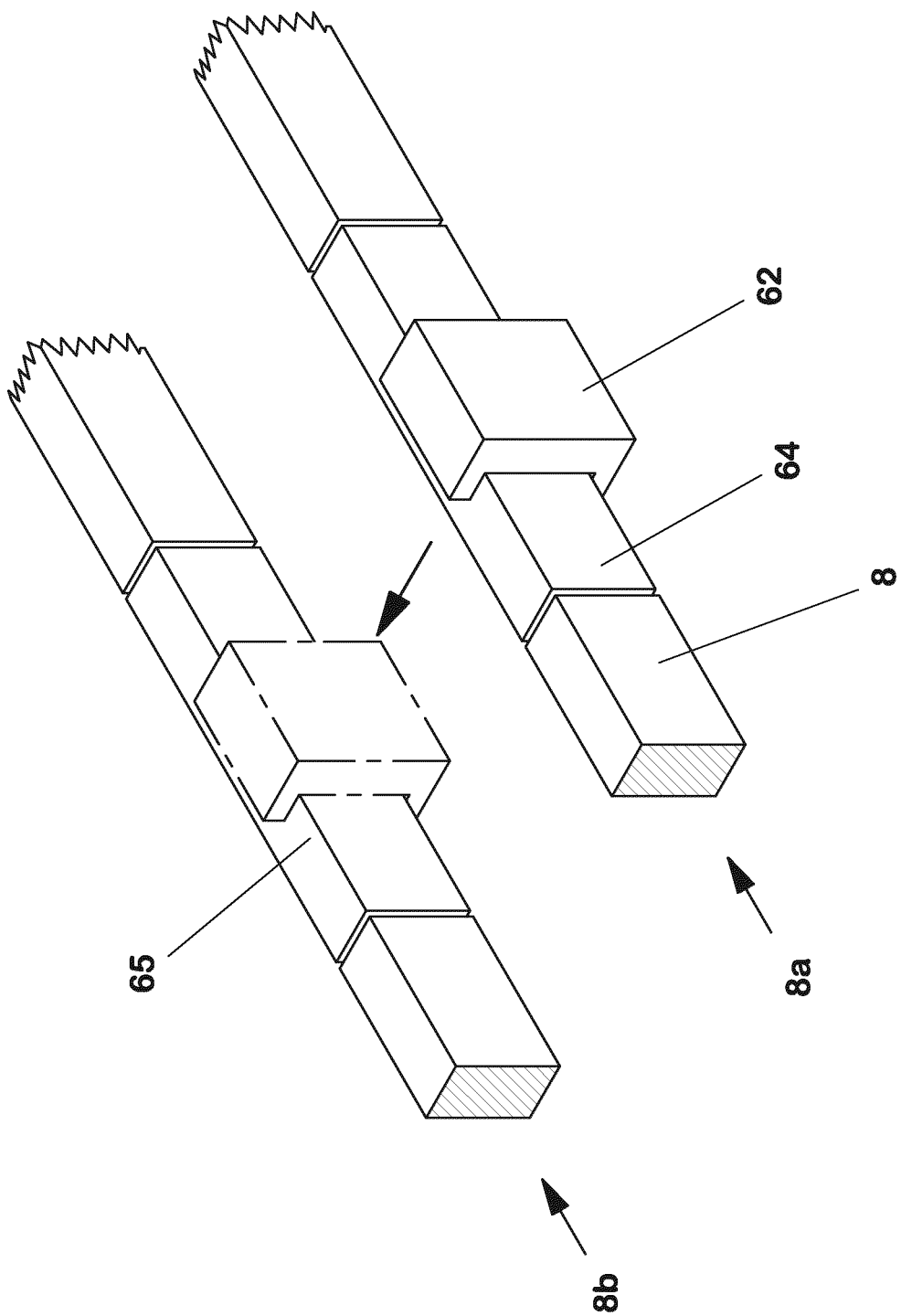
Figure 27:
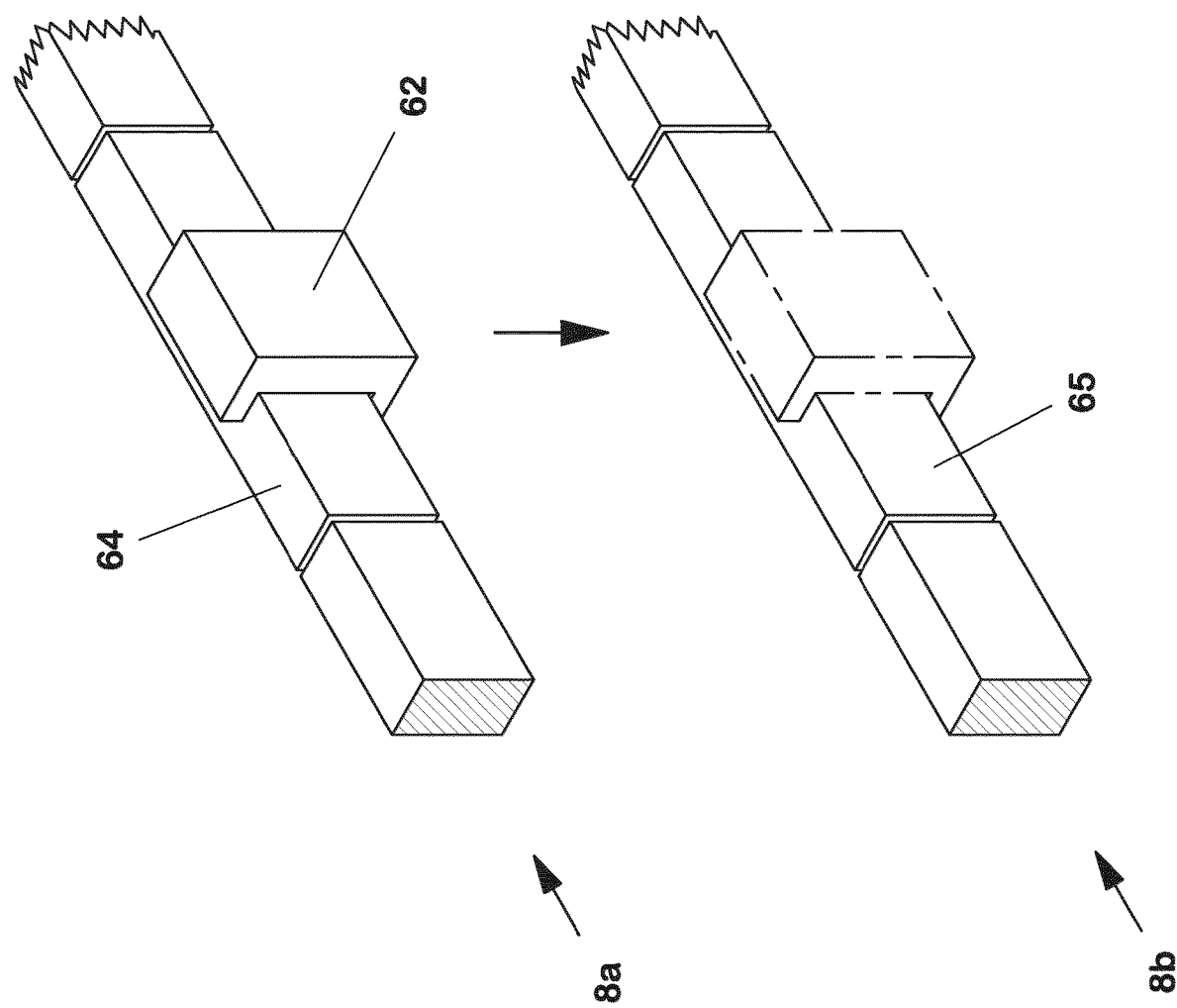
Figure 28:
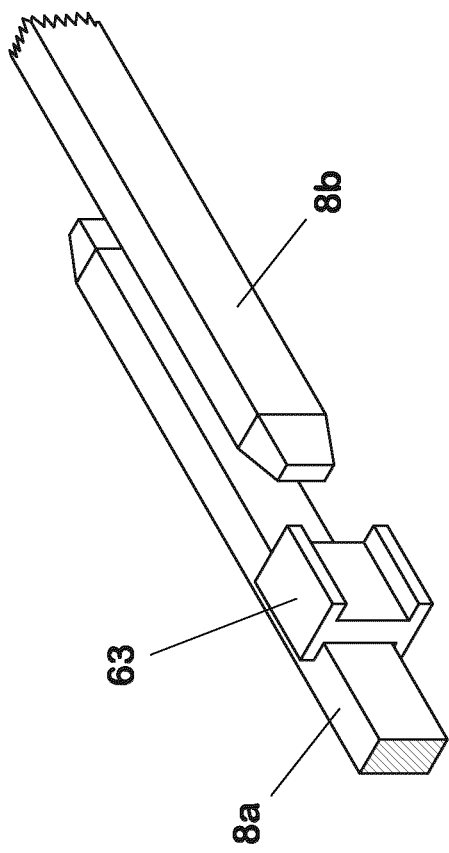
Figure 29:
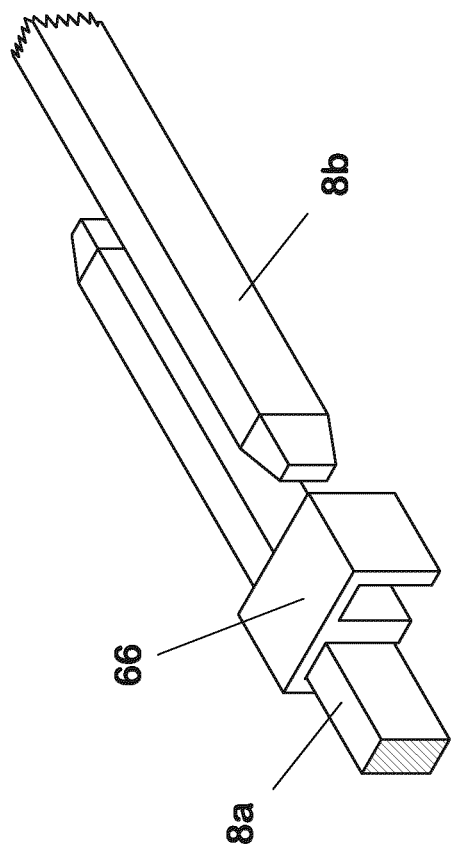
Figure 30:
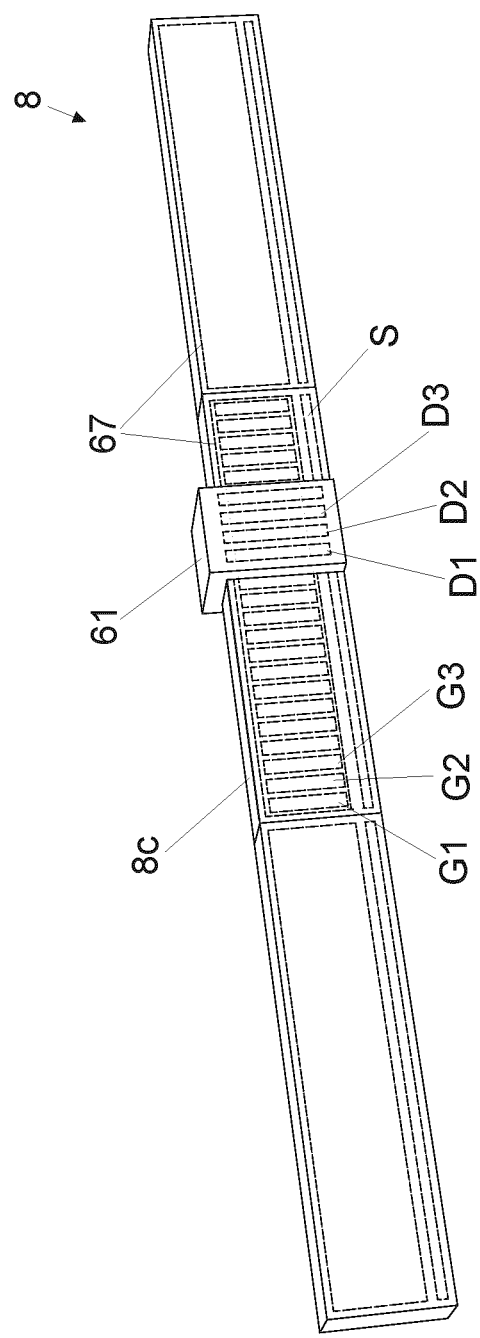
Figure 34:
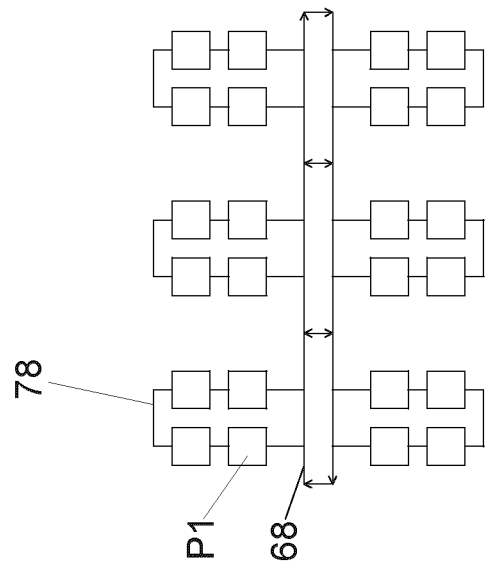
Figure 35:
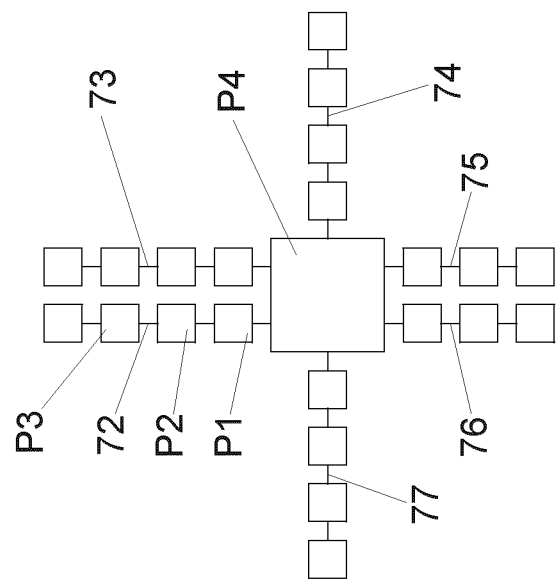
Figure 37:
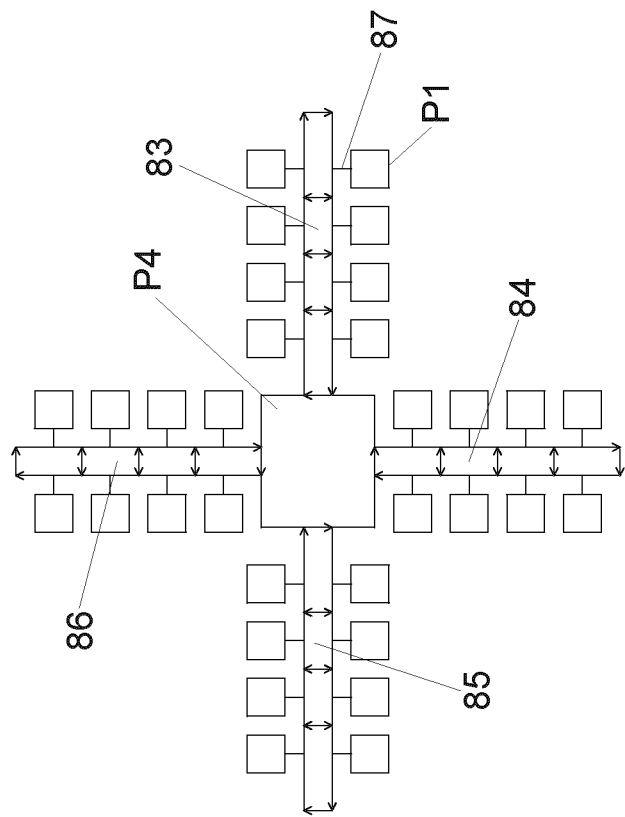
Figure 36:
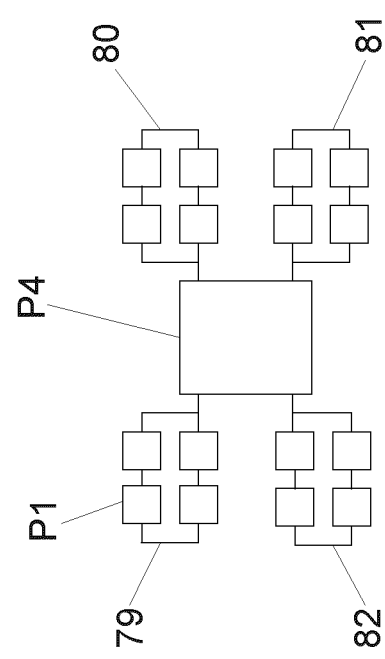
Figure 40C:
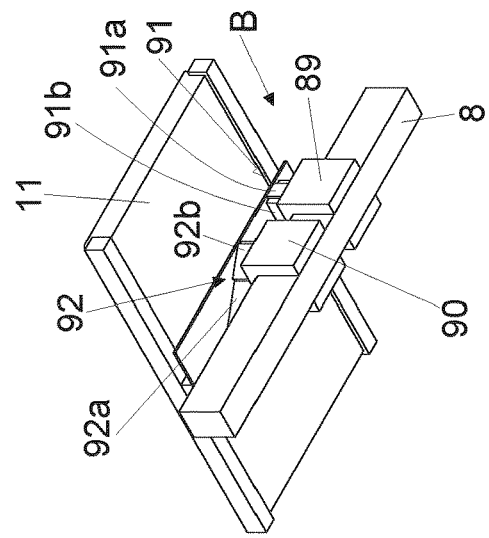
Figure 40B:
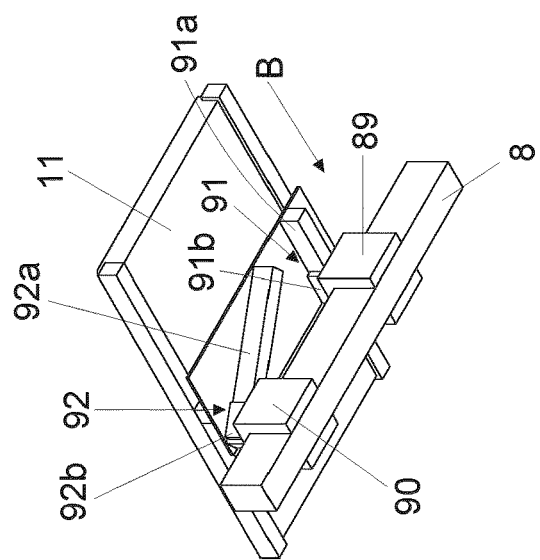
Figure 40A:
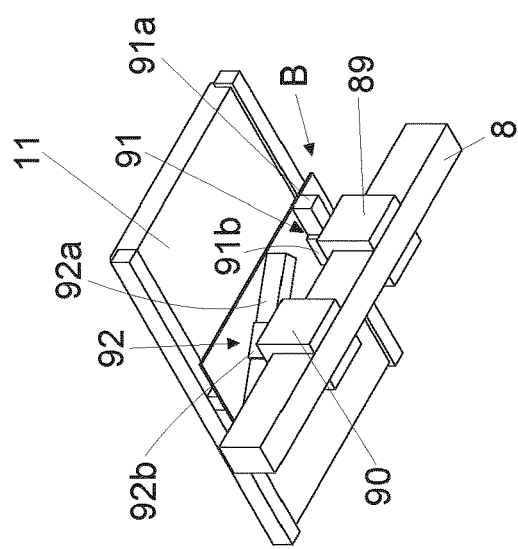

The invention is described hereinafter with reference to a number of figures in which:

FIG. 1 shows a diagrammatic view of a transport system according to the invention integrated in an industrial confectionery machine including a plurality of production stations, FIG. 2 shows a diagrammatic view of an alternative transport system with an additional movement device for an auxiliary movement, FIG. 3 shows a further embodiment of a transport system according to the invention, FIG. 4 shows a development of the transport system of FIG. 3, FIG. 5 shows a view of a portion of a transport system with transport rail and carriage element and receiving device including a mold, FIG. 6 shows a portion of a transport system, FIGS. 7a/7b show a portion of a transport system with transport rail and with a receiving device carried by two carriage elements, FIG. 8 shows an application of the transport system of FIG. 7a, FIG. 9 shows a development of the transport system based on the structure in FIG. 7a, FIG. 10 shows a further application of the transport system of FIG. 7a, FIG. 11 shows an alternative of a transport system having two carriage elements per receiving device, FIG. 12 shows a further alternative of a transport system having two carriage elements per receiving device, FIG. 13a/13b shows an alternative of a transport system having three carriage elements per receiving device, FIGS. 14a/14b show an alternative transport system with pivotable receiving device mounted to a carriage element, FIGS. 15a/15b show a transport system with additional movement device for a lift movement, FIG. 16 shows a transport system with additional movement device, also for a lift movement, FIG. 17 shows a transport system with additional movement device for rotation of a mold, FIG. 18 shows an application of a transport system with movement devices for rotation of two mold halves irelative to each other, FIG. 19 shows a portion of a transport system with transport rail, carriage element and additional movement device for an auxiliary movement, FIGS. 20-25 show cross-sections by way of example of a transport rail and cross-sections of the carriage element and the arrangement thereof in space, FIG. 26 shows a portion having two parallel transport rails and horizontally moveable rail portions, FIG. 27 shows a portion having two parallel transport rails and perpendicularly moveable rail portions, FIG. 28 shows two transport rails and a carriage element of a double T-shaped cross-section, FIG. 29 shows two transport rails and a carriage element of m-shaped cross-section, FIG. 30 shows a transport system with a modular transport rail, composed of rail portions which are adapted to form the primary part of a linear motor, FIG. 31 shows the transport rail network in a series layout, FIG. 32 shows the transport rail network in a ring layout, FIG. 33 shows the transport rail network in a bus layout, FIG. 34 shows the transport rail network in a star layout, FIG. 35 shows the transport rail network in a bus-ring layout, FIG. 36 shows the transport rail network in a star-ring layout, FIG. 37 shows the transport rail network in a star-bus layout, FIG. 38 shows the transport rail network in a ring-parallel layout, FIG. 39 shows the transport rail network in a series-parallel layout, FIGS. 40a-c show a portion of a transport rail with a receiving device which is carried by two carriage elements and an additional movement device for an auxiliary movement in the Y-direction, FIG. 41 shows a diagrammatic view of the control device, FIG. 42 shows an embodiment by way of example for a frameless receiving device, FIG. 42a shows a portion of the receiving device of FIG. 42 with an example of a positioning aid, and FIG. 42b shows a portion of the receiving device of FIG. 42 with an alternative positioning aid.

FIG. 1 diagrammatically shows a first embodiment of a transport system 1 according to the invention. For better understanding the transport system 1 is shown together with parts of an industrial confectionery machine 2, into which it is integrated. The confectionery machine 2 includes a plurality of production stations, here a first molding station 3, a shell shaping station 4, a second molding station 5, a cooling station 6 and a demolding station 7. In the present example there are provided those production stations which are suitable for the production of a hollow confectionery article having a filling.

The proposed transport system 1 includes a transport rail 8 and a drive device 9 having a number of rail-guided carriage elements 10. The carriage element 10 runs on the transport rail 8. Provided on the carriage element 10 is a receiving device 11, with which at least one mold can be received. The rail-guided carriage element 10 can produce a transport movement in order to transport the mold 12 along the transport rail 8 to one of the production stations 3, 4, 5, 6, 7. The carriage element 10 can be moved individually along the transport rail 8 and for that purpose is drivable on its own by means of the drive device 9.

In addition there is provided a control device 13, by means of which a main movement for the carriage element 10 is controllable along the transport rail 8. The main movement is implemented by the carriage element 10 together with the receiving device 11 in order finally to move the mold 12 which is to be transported thereon. The main movement occurs in the transport direction towards the respective production stations 3, 4, 5, 6, 7. In addition, the transport system 1 provides that it can additionally transmit an auxiliary movement to the receiving device 11 by means of the control device 13 in order to be able to suitably move the mold 12 for given production steps. The auxiliary movement can be a simple movement or a complex movement composed of different movement components. In the simplest form, the auxiliary movement can take place in the direction of the transport rail and superimposed on the main movement, as explained by way of example hereinafter with reference to FIGS. 5 and 6.

The auxiliary movement is desirable as it is required for certain production steps to be able to move the mold 12 in a given fashion relative to the production station.

The transport system 1 includes the above-mentioned transport rail 8 which as shown in FIG. 1 is extended to constitute a transport rail network 14. In the present example, the carriage element 10 has rollers (not shown) which rest and roll on an upwardly directed running surface on the transport rail 8. The transport rail 8 is highly load-bearing. It is suitable for heavy loads, for example a large mold which contains many confectionery articles at once and is comparatively heavy.

As shown in FIG. 1 the transport rail network 14 has a bus layout with a ring-shaped main rail 15 having two long rail portions 16 and 17 which extend straight. The straight rail portions of the main rail are connected by two 180° curves 18 and 19 and thus form the ring. Lateral branch rails are provided at both straight rail portions of the main rail. There are branch rails which lead into one of the production stations and back to the main rail, namely a branch rail 20 through the first molding station 3, a branch rail 21 through the shell shaping station 4, a branch rail 22 through the second molding station 5 and a branch rail 23 through the demolding station 7. The branch rails 20, 21 and 23 extend in a loop which begins at the main rail and ends there. The mold 12 can pass through those branch rails 20, 21 and 23 in one direction. In between the mold stops in the respective production station in order to carry out the production step intended there. The branch rail 22 functions differently, going into the second molding station. The branch rail 22 is not a loop but virtually ends like a dead end in the production station. A mold can be moved forwardly on the branch rail 22 into the production station and later has to be moved rearwardly out of same when the production step is finished. The transport rail can be passed in a loop through a production station or it can be in the form of a dead end into and out of same. Both concepts can be used depending on the respective requirements. The concept of providing a dead end is rather more space-saving. The production station can be narrower and a shorter rail length is required than in the case of a branch rail which is passed in a loop.

FIG. 1 shows by way of example some production stations of a confectionery machine. These involve production stations which could be used for the production of filled hollow bodies. It will be noted however that the diagrammatic view is highly simplified and omits other production stations that a confectionery machine for the production of filled hollow bodies usually includes. It will be clear from the diagrammatic view however that the mold 12 can be fed to the required production steps in the correct sequence and nonetheless variably. Thus a mold for example can remain entirely individually shorter or longer in the cooling station and later be restored to transport again.

The illustrated embodiment in the region of the cooling station 6 has branch rails 25 and 26 which lead from the straight rail portion 17 of the ring-shaped main rail 15 in the direction of the cooling station 6. In addition upstream of the cooling station a secondary rail 27 extends parallel to the rail portion 17 of the main rail. The secondary rail 27 itself has two secondary rail branches 28 and 29 from the straight rail portion 17 of the main rail. The secondary rail forms with the secondary rail branches so-to-speak a loop which begins and ends at the main rail. The other two branch rails 25 and 26 extend as a transverse connection between the rail portion 17 of the main rail and the secondary rail 27.

The transverse connections and the secondary rail branch 29 are disposed upstream of the cooling station 6. The cooling station has a device (not shown) which is adapted to remove molds from the carriage element or from the receiving device and transfer them into the cooling station.

At least the branch rails extending as the cross connection can serve as a buffer space in order to temporarily park a mold 12 there. In that way other carriage elements with molds can freely pass along the main rail or the secondary rail respectively.

As can be seen by reference to FIG. 1, the transport system 1 overall serves to transport molds 12 through the confectionery machine 2 and more specifically to the respective production stations 3, 4, 5, 6, 7 which can perform a corresponding production step. The sequence in which a mold 12 is transported to the production stations is in particular variable by virtue of the proposed transport rail network 14. The transport rail network 14 can also be expanded and upgraded. It can profit from different network layouts. Examples of network layouts are described hereinafter (FIGS. 31 to 39) and also examples of how different layouts of the transport rail network can be combined together.

In principle, a mold 12 can be moved selectively in both directions along the transport rail 8, 15, 16, 17, 18, 19, 25, 26, 27, 28 and 29 forward and back. It can selectively remain on the main rail 15 at a fork in the transport rail or it can be transported on to a branch rail or secondary rail.

Besides a variable layout implementation within a transport rail system 14, another important aspect of the transport system is that the auxiliary movement already mentioned hereinbefore can be transmitted to the mold 12. As described hereinbefore the simplest form of the auxiliary movement takes place in the direction of the transport rail 8. That can be for example a to and fro shaking movement in the transport rail direction. For that purpose, the carriage element with the receiving device that carries the mold is moved forward and back at a suitable frequency along the transport rail in order to produce a shaking movement at the desired frequency and amplitude. In conventional confectionery machines with a chain drive, a specific shaking station is required for the shaking operation. The shaking operation distributes confectionery material in a mold, which had previously been introduced into the mold in metered fashion by means of a molding machine. In addition the shaking operation can convey unwanted air bubbles to the surface if such bubbles are contained in the confectionery material. Possibly air, which can be included in the confectionery material, can be removed by shaking. It is now possible to save on a separate shaking station by virtue of the transport system according to the invention.

A further application of an auxiliary movement is producing a grouping consisting of a plurality of carriage elements 10 or a plurality of molds 12, as will be further described hereinafter with reference to FIG. 6. There are production steps in the manufacture of confectionery articles, for which desirably more time should be granted than is available in a usual cyclic mode of operation of a confectionery machine. To permit that there are production stations into which a plurality of molds can be fed in an accelerated fashion in order thereby to achieve a time saving. For conventional confectionery machines, a dedicated station is known from DE 10 2005 018 416 A1, which serves only for grouping molds 12 to achieve the above-mentioned time saving. All molds of a group which are to be simultaneously subjected to the same production step now have somewhat more time for carrying out the respective process by virtue of the time saving. Subsequent transport of the grouped molds out of the production station breaks up the grouping again. That can also take place at an accelerated pace, which permits a further time saving for the production step.

The production of a confectionery article in the form of a filled hollow body includes production of the shell from a first confectionery material, then cooling of the shell, then the introduction of a filling. Then a top has to be molded in place, which is joined to the shell edge and sealingly encloses the filling. For that purpose the same confectionery material is frequently used for the top as for the shell.

In contrast to a conventional confectionery machine with a conveyor chain, the proposed transport system 1 makes it possible for a mold 12 to be transported during the production of a confectionery article to the same production station a plurality of times in order to carry out therein different production steps on a confectionery article which is being produced, at different stages in production. In a conventional confectionery machine with a conveyor chain, production stations are arranged in series. Usually there are a plurality of molding stations although for example the same confectionery material has to be molded for a top as previously for the shell. In a conventional confectionery machine, a single molding machine itself is then not sufficient if it requires the same confectionery material for different production steps on a confectionery article.

The transport system 1 according to the invention as shown in FIG. 1 makes it possible to provide a first molding station 3, with which firstly a first confectionery material is introduced into the mold 12 in order therewith to produce a shell, in which case the same first molding station 3 can later be used again to carry out a second production step for which the same first confectionery material is used.

Firstly, however the mold 12 is transported out of the first molding station 3 along the transport rail 8 to the shell shaping station 4 in which the shell is produced. In the present example, the shell shaping station 4 is in the form of a ram station. It has a ram (not shown), the ram can be engaged into the mold 12, which is filled with confectionery material in order thereby to displace the confectionery material. The displacement effect means that the confectionery material is distributed between the outside surface of the ram and the inside surface of the mold. The resulting space therebetween forms a shell-shaped volume so that in that way it is possible to shape a shell from the confectionery material.

The shaped shell is then further transported from the shell shaping station 4 along the transport rail 21, 18, 22 to the second molding station 5 or firstly transported to the cooling station and only after sufficient solidification thereof transported to the second molding station. With the second molding station 5, a second confectionery material is introduced into the shell in metered fashion as the filling of the confectionery article.

After each production step, the mold 12 can be transported into the cooling station 6 in order to be cooled down and solidified there. At a given time when a desired degree of solidification has occurred the mold 12 can be transported out of the cooling station 6 and along the transport rail 8 to the next production station in order to carry out the next production step required. If after a production step no solidification in the cooling station should be required, the mold can be transported on the main rail past the cooling station to another production station.

When the shell has been provided with its filling the above-mentioned top material is then also molded on to the filling. For that purpose, the mold 12 is transported once again to the first molding station 3 which then now molds the same first confectionery material as was previously used for the shell as the top material on the filling. The opening of the shell should thereby be closed sealingly all around.

If it is desirable to previously warm the shell edge in order to make a good join between the shell edge and the top a suitable production station can optionally be provided for that purpose, which can melt the shell edge (not shown).

Trigger points are provided along the transport rail 8. Control software can virtually image the transport rail network in the control device 13 and image process-relevant trigger points along the transport rail. A trigger point involves given locations on the transport rail, for example the trigger point X1 at the entry into the demolding station 7. In addition the carriage element position has to be detected, for example, as described hereinafter with reference to FIG. 30. When now a carriage element in its movement along the transport rail reaches the trigger point X1 at the entry to the demolding station 7 the control device 13 can trigger a suitable process movement which is required in the corresponding production station for the mold which is being moved thereinto.

A trigger point can also be provided at the exit from a production station, like the trigger point X2 at the exit from the demolding station 7. Here the fact of the mold leaving is detected. A further trigger point X3 can be provided downstream, with which there is associated information as to whether there is space for a further mold in the following part of the transport rail 8.

In principle it is possible to provide at any locations within the transport rail network, trigger points which, by means of the control device, can implement triggering or stopping of processes or which can influence the further transport or a stoppage of the mold by program control. What function a trigger point triggers can be dependent on the direction from which a carriage element approaches. The transport system can be designed in such a way that a mold can be moved into and out of a production station from both directions. Trigger points at entry and exit can be so designed that both kinds of function can be performed, depending on the direction from which the mold arrives, that is to say either they can trigger the required process or they can detect the subsequent departure of the mold.

The real transport movement of a carriage element can also be moved in the control software as a virtual carriage position point as it can be exactly detected, as mentioned above. As a result under software control processes or transport functions can be activated wherever a carriage position point reaches a trigger point.

A development of the transport system 1 is shown in FIG. 2, where the carriage element 10 is provided with an additional movement device B which can contribute to performing a complex auxiliary movement of the mold 12, in particular a perpendicular movement component can be created. The movement device B is arranged between the carriage element 10 and the receiving device 11 for the mold 12. In the present example the additional movement device B cooperates with two respective carriage elements. By virtue of a relative movement of the two carriage elements away from and towards each other the perpendicular movement is implemented to raise or lower the receiving device. The movement device B in FIG. 2 corresponds to that which is described in detail hereinafter with reference to FIG. 11.

The additional movement device B is highly appropriate in order for example in the molding station 12 to produce an auxiliary movement in a vertical direction, in which respect vertical basically means the direction of the force of gravity (Z-axis). In that way the mold 12 can be lifted in the direction of a molding nozzle of the molding station 3 and can be controlledly lowered again during the molding operation.

Furthermore the additional movement device B is beneficial in the shell shaping station 4. The shell shaping station provided here operates by means of a ram which is engaged into fluid confectionery material in order to produce the configuration of the article shell. The ram operation is in principle an extrusion process which distributes the confectionery material in the space between the mold and the ram and thus imparts the desired shape to the shell. The ram provided is arranged stationarily. The relative movement between the ram and the mold, that is necessary for the extrusion effect, is produced only by a perpendicular movement of the mold upwardly in the direction of the ram. According to the invention the process movement for the extrusion operation can be produced solely by the additional movement device B.

In the second molding station 5 shown in FIG. 2c the mold can be raised and lowered in an also controlled fashion for metered feed of a filling material thereinto, if desired.

In the demolding station 7, the mold 12 is turned upside down, that is to say the top side of the mold is turned downwardly so that the finished confectionery article can drop out. The demolding station shown in FIGS. 1 to 4 has a separate device for turning the mold through 180° (not shown).

Details of some embodiments for movement devices which can produce a perpendicular movement component for raising/lowering molds are described hereinafter with reference to FIGS. 7a to 13b and FIGS. 15a to 16.

An alternative embodiment of a transport system according to the invention is shown in FIG. 3. It has a transport rail network 14 which is identical to that transport rail network 14 shown in FIG. 2, but—like FIG. 1—it dispenses with an additional movement device which could produce a perpendicular movement component.

The transport rail 8 and the carriage element 10 are adapted as shown in FIG. 3 so that the carriage element can be coupled to a side surface of the transport rail and can be moved along same. The carriage element can be held laterally either by a holding bar or holding roller, for example in the manner of a sliding door fitment, or alternatively by magnetic force.

The carriage element 10 shown in FIG. 3 is of a symmetrical configuration, that is to say it has a left and a right side. Optionally its left coupling side can be coupled to a transport rail arranged at the left or conversely a right coupling side can be coupled to a transport rail arranged at the right. The transport rails are composed of straight portions and curved portions. The transport rail network can have forks at which a carriage element can be selectively moved straight ahead or can be branched off.

The carriage element which can be coupled at both sides can be switched over from coupling with its left side to a transport rail provided at the left of the carriage element, to coupling at a transport rail arranged at the right.

A further embodiment of the transport system in FIG. 4 is based on that shown in FIG. 3, insofar as it has an identical transport rail network 14 and is composed of the same portions of transport rails. Once again a carriage element can be coupled laterally/at both sides (left/right) to the transport rail and can be moveable along same. The difference in the FIG. 4 embodiment in relation to FIG. 3 is an additional movement device B with which in particular it is possible to produce a perpendicular movement component. The additional movement device B performs the same functions as that in FIG. 2.

FIG. 5 diagrammatically shows an auxiliary movement which the carriage element 10 can produce together with the receiving device 11 by a reciprocating movement along the transport rail, namely a shaking operation. The frequency and amplitude of the shaking movement can be defined and adjusted by means of the control device 13 and the drive device 9 for the carriage element 10.

In addition the FIG. 5 arrangement has a drive device 9 with an electric motor T1.

FIG. 6 shows a further application for an auxiliary movement which takes place in the direction of the transport rail 8, more specifically here a group is formed from for example four carriage elements 10a, 10b, 10c and 10d which are respectively grouped at a spacing b relative to each other. The transported molds 12 can then be simultaneously fed in the form of a group to a production step. If the transfer of the carriage elements into the group takes place in an accelerated fashion, that is to say with a faster movement than the transport speed prior to group formation, it is then possible to save time which can be of advantage to the production step which is to be carried out at the same time. That kind of grouping replaces a dedicated device which is known for that purpose, as is disclosed in DE 10 2005 018 416 A1.

An additional movement device B for the receiving device 11, on which a mold 12 can be transported, is shown in FIGS. 7a and 7b. Here there are two carriage elements 30 and 31 on a transport rail 8. A joint bar 32 is mounted rotatably at one end on the carriage element 30. The other end of the joint bar 32 is rotatably connected to the receiving device. Equally there is a joint bar 33 which is connected rotatably in the same manner to the carriage element 31 and the receiving device. The whole forms a transport unit which overall can be moved as a unit within the transport rail network. Starting from FIG. 7a, a reduction in the spacing between the carriage elements 30 and 31 provides a perpendicular movement of the receiving device, it is lifted at a maximum up to the level indicated in FIG. 7b. Likewise the receiving device starting from FIG. 7b can be lowered to a lower level by an increase in the spacing between the carriage elements 30 and 31. In order to be able to move the transport unit along a curve, that is to say a curved transport rail, the arrangement has axes of rotation A1 and A2.

FIG. 8 shows how, with an embodiment as shown in FIGS. 7a/7b, a shaking movement can be produced in a perpendicular direction, more specifically by a reciprocating movement of the two carriage elements 30 and 31 at the desired frequency and amplitude.

FIG. 9 shows a development of the embodiment shown in FIG. 8, insofar as, where the joint bars are rotatably connected to the receiving device, there is a respective spring element F1 and F2, for example a rubber spring element. The spring elements can damp oscillations. They improve the longevity of the bearings and save the carriage element from having to absorb severe shocks.

FIG. 10 shows another application of the embodiment of FIGS. 7*a*/7*b*, more specifically here there are shown two rotating rollers, so-called lick-off rollers R1 and R2, which serve to lift off dirt and remove it from the surface of a mold 12, in particular dirt in the form of confectionery material. The mold 12 can be lifted exactly in the direction of the lick-off rollers R1/R2 with the additional movement device B. In use the rollers R1/R2 bear with their own weight on the mold. A particular application of the lick-off rollers involves exactly forming the shell edge of a previously shaped confectionery shell. In that case the lick-off rollers and the confectionery shell are moved towards each other to such an extent that a defined gap still remains.

A further embodiment is shown in FIG. 11 in which once again an additional movement device B has two carriage elements 30 and 31 cooperating with the receiving device 11 for the mold 12. In that way the mold is carried and a perpendicular auxiliary movement of the receiving device 11 can be produced. This embodiment however has two joint bars 34 and 35 in the form of a joint bar pair. Both joint bars are associated with a carriage element 30 and are mounted rotatably thereto. In this case the axes of rotation of the two joint bars are at the same level. At the other end each joint bar 34 and 35 is connected rotatably to the receiving device 11 and here too the axes of rotation of the joint bars are at the same level. Overall the carriage element together with the two joint bars and with the receiving device forms a parallelogram. This configuration in the form of a parallelogram ensures that the receiving device always remains horizontal upon lifting and lowering. The second carriage element 31 and the receiving device cooperate in the same manner with a second joint bar pair comprising the joint bars 36 and 37 which are arranged in mirror-image relationship with the first joint bar pair and also hold the receiving device horizontal. Provided on each carriage element is a perpendicular axis of rotation A1 and A2 respectively, to be able to follow a curve in a transport rail.

The embodiment in FIG. 12 is based on FIG. 11 and only differs therefrom in that a carriage element 30 has a joint bar pair which includes the two joint bars 34 and 35 while the second carriage element 31 dispenses with a parallelogram and is only connected to the receiving device 11 by way of a single joint bar 35. The horizontal orientation of the receiving device is therefore achieved here only by a parallelogram based on the carriage element 30.

A further embodiment with an additional movement device for the receiving device 11 is shown in FIGS. 13*a* and 13*b*. This embodiment uses three carriage elements 30, 31 and 38 to carry and move the receiving device 11. A respective joint bar 34, 36 and 39 is mounted rotatably to each of the carriage elements. However there are only two axes of rotation on the receiving device 11. Only the joint bar 34 which connects to the carriage element 30 is connected to the first axis of rotation. The two joint bars 36 and 39 are connected to the second axis of rotation, of which the joint bar 36 is rotatably mounted to the carriage element 31 and the joint bar 39 is rotatably mounted to the carriage element 38. A perpendicular axis of rotation A1, A2 and A3 respectively is provided on each carriage element in order here too to be able to follow a curve in a transport rail as well as perpendicular axes of rotation A4 and A5 on the receiving device.

The receiving device 11 can be inclined with the arrangement shown in FIGS. 13*a*/13*b*. As shown in FIG. 13*a* the receiving device 11 is oriented parallel to the transport rail 8 (horizontally). Starting from FIG. 13*a*, FIG. 13*b* shows an increase in the spacing between the carriage elements 36 and 38, which results in an inclination of the receiving device 11. An inclination of the receiving device 11 is desirable for the novel transport system for the reason that a mold 12 can be individually accelerated to high speed and can be retarded/braked equally quickly. It is possible to implement higher speeds than is known in respect of conventional confectionery machines with a conveyor chain. In a mold 12 which contains a fluid confectionery material that material can slosh to and fro upon acceleration and deceleration and there is the risk that confectionery material can slosh out over the edge of the mold 12. For that reason it is desirable to counteract that, but not for example by closing the mold, but by the mold being capable of being inclined about a horizontal axis which is arranged at a right angle (transversely) to the transport rail 8.

FIGS. 14*a* and 14*b* show an alternative embodiment with inclinable receiving device 11 which can also be inclined about a horizontal axis 40 which is at a right angle to the transport rail 8. This embodiment however provides only one carriage element 30. Upon acceleration/deceleration of the receiving device 11 the inclination is produced for example by mounting beneath the axis 40 an inertial mass which, upon acceleration in the direction of the transport rail, endeavors to remain in its rest state and produces a tilting movement. An opposite tilting movement occurs when the receiving device is decelerated. Preferably, there is also a damping element to counteract a to and fro swing in movement.

An inclination about another horizontal axis can also be appropriate, more specifically when it is arranged parallel to the transport rail 8 (not shown). Thus it is possible to counteract confectionery material sloshing out of the mold when centrifugal forces are acting, for example in a movement of the mold 12 on a curve. That can be implemented on the basis of the same principle as above, also by means of an inertial mass beneath the horizontal axis.

FIGS. 15*a* and 15*b* show a further embodiment having an additional movement device B with which the receiving device 11 for the mold can be moved up and down. In that case a spindle 41 having a motion thread is used. The spindle is arranged perpendicularly on a carriage element 42 which is carried on a transport rail 8. As shown in FIG. 15*a* the receiving device 11 for the mold 12 is disposed at the upper end of the spindle. The arrangement has a nut thread element 43 for the motion thread of the spindle 41. The nut thread element 43 is associated with the carriage element 42 and is mounted rotatably relative thereto. When the nut thread element 43 is rotated anti-clockwise or clockwise the spindle moves up and down. To set the nut thread element 43, rotating it is provided with an external tooth arrangement 44 cooperating with a toothed rack 45. FIG. 15*b* shows a plan view of the nut thread element 43 with the external tooth arrangement 44 and of the toothed rack 45. The toothed rack 45 is rigidly connected with one end to a second carriage element 46 which is moveable along the transport rail. By a movement of the second carriage element 46 relative to the first carriage element 42 along the transport rail 8 the spindle and therewith the receiving device 11 can be moved up or down, in which respect two linear guides are provided for same parallel to the spindle (they are not shown) which prevent the receiving device from also being rotated therewith.

FIG. 16 shows an embodiment with an additional movement device B which in turn operates with two carriage elements which are coupled to a transport rail 8. A first carriage element 47 carries a receiving device 11 which is arranged at two perpendicularly disposed guide rails S1 and S2, on which they can slide up and down. The drive for the up and down movement is provided by means of two joint bars arranged in a scissor-like configuration. Of those joint bars, one joint bar 48 is rotatably connected with an end to the receiving device 11 and the second joint bar 49 is rotatably connected with an end to the carriage element 47. The other two ends of the joint bars 48 and 49 are combined together and connected at a common axis of rotation to the second carriage element 50. A movement of the two carriage elements 47 and 50 towards each other causes the receiving device 11 to be lifted and with a movement of the two carriage elements away from each other the receiving device is lowered.

FIG. 17 shows an embodiment having an additional movement device B which is intended to provide for rotation of the mold 12. Once again there are two carriage elements 51 and 52. A receiving device 11 is mounted to the first carriage element 51 in such a way that it is rotatable about an axis of rotation R, with the axis of rotation being disposed horizontally and at a right angle to the transport rail 8. Provided in the axis of rotation is a gear element Z cooperating with a toothed rack 53. The toothed rack is rigidly connected with an end to a second carriage element 52 and can be moved by same along the transport rail 8 in order to drive the gear element Z and to cause forward and rearward rotation of the axis of rotation. An example of use is the demolding station in which a mold is rotated through 180° in order to cause finished confectionery articles to drop out of the mold.

The same principle of rotating a mold is used as shown in FIG. 18 to combine together a mold consisting of two mold portions 12a and 12b. For that purpose each mold portion is rotated in opposite directions of rotation through 90° respectively and both top sides are joined together. Preferably, hollow bodies comprising chocolate are produced in such divided molds.

FIG. 19 shows an embodiment with a transport rail 8 and a U-shaped carriage element 55. An adaptor 56 is shown on the carriage element. An additional movement device B is again provided on the adaptor. The movement device is in the form of a rotary joint 57. The rotary joint is suited as a receiving device for a mold. As indicated in FIG. 19 the rotary joint can be rotated about its own perpendicular axis of rotation 58 (Z-axis). It has a bore 59 radially with respect to its own axis of rotation 58. A shaft can be introduced into the bore 59 and secured therein. A mold can be mounted laterally to the shaft. In that way, fixed to the shaft, the mold can be rotated about the axis of rotation 58 of the rotary joint. The mold can also rotate about the axis of the bore 59. The rotary joint 57 can have abutments to limit the rotation about the axis of rotation 58 or about the axis of bore 59 respectively. As shown in FIG. 17 the drive can be implemented by way of a second carriage element in which a toothed rack is fixed and with a gear which is provided on the axis of rotation and which cooperates with the toothed rack.

Alternatively it is possible to provide stationarily in a production station, a pneumatic or electric drive which can be temporarily connected by way of a coupling device to the respective axis of rotation 58 and 59 respectively and in order to produce the required auxiliary movement.

FIGS. 20 to 25 show various cross-sections and spatial arrangements of a transport rail of rectangular cross-section, and the cross-section through the carriage element.

In FIGS. 20 to 23 the cross-section of the rectangular transport rail 8 is arranged upright. FIG. 20 shows a carriage element 60 with a cross-section closed in a ring form. The transport rail 8 is here entirely enclosed by the carriage element 60. FIGS. 21 and 22 show carriage elements with a U-shaped cross-section. The carriage element 61 in FIG. 21 is arranged with its downwardly open cross-section on the transport rail 8 and the carriage element 62 in FIG. 22 has a laterally open cross-section with which it is arranged on the transport rail 8. FIG. 23 shows two transport rails 8a and 8b in mutually juxtaposed relationship and a carriage element 63 which is of a double T-shaped cross-section open at both sides. A respective one of the two transport rails 8a and 8b respectively fits into the open cross-sections of the double T-shaped carriage element 63.

FIGS. 24 and 25 each show a transport rail 8 of a cross-section which is inclined through an angle a with respect to the perpendicular. In FIG. 24, the identical U-shaped carriage element 61 is arranged on the transport rail 8, as in FIG. 21. In FIG. 25, the identical U-shaped carriage element 62 is arranged as shown in FIG. 22. Arranging the transport rail 8 inclined through an angle α with respect to the perpendicular can be beneficial if there is not sufficient space for an upright arrangement. An inclination means that somewhat less height is required for the transport rail 8.

FIG. 26 shows two portions of transport rail 8a and 8b, which are arranged in mutually juxtaposed relationship at a spacing. The transport rails 8a have a gap in which a rail intermediate portion 64 is provided. Likewise the transport rail 8b has a gap which is closed by a rail intermediate portion 65. The transport rails can be passed along by way of the rail intermediate portions. In addition the rail intermediate portions 64 and 65 are laterally displaceable. The rail intermediate portion 64 can be moved into the gap in the other transport rail 8b, in which case the rail intermediate portion 65 there then retreats. The same conversely applies. The rail intermediate portion 65 can be moved into the gap in the other transport rail 8a and the rail intermediate portion 64 there then retreats. A switch device is formed in that way. When a carriage element 62 approaches on the transport rail 8a and has reached the rail intermediate portion 64 it can then be displaced laterally together with the carriage element 62 into the gap in the transport rail 8b. In that way the carriage element 62 can switch on to the transport rail 8b. The arrangement therefore serves as a switch device.

FIG. 27 shows the same principle of a switch device as FIG. 26, but in this case the transport rails 8a and 8b are arranged in mutually superposed relationship and not in mutually juxtaposed relationship. Otherwise, the functionality is as shown in FIG. 26. Both transport rails have gaps, in which there are rail intermediate portions 64 and 65 respectively, which can be moved up and down, in each case into the gap in the other transport rail.

FIGS. 28 and 29 show two embodiments of carriage elements which can respectively switch from a transport rail 8a on to a transport rail 8b. FIG. 28 shows an end of the transport rail 8a and an end of the transport rail 8b. The ends of both transport rails overlap in a certain region thereof. The carriage element 63 shown in FIG. 28 is of a double T-shaped configuration and corresponds to that shown in FIG. 23. When it is moved on the transport rail 8*a* in the direction of the overlap region and passes same then its further movement is on the transport rail 8*b* after the overlap.

The carriage element 66 in FIG. 29 is of a cross-section with two openings directed towards the same side (downwardly). When it moves on the transport rail 8*a* in the direction of the overlap region and passes same then its further movement is also on the other transport rail 8*b* after the overlap.

FIG. 30 shows a transport rail 8 which is of a modular structure. A plurality of rail portions like the rail portion 8*c* are placed in series in successive relationship. The regions shown in broken line like the region 67 of the rail portion 8*c* are provided with a plurality of coil elements G1, G2, G3, and so forth. The coil elements are provided along the rail portion and together form a so-called long stator. The long stator forms the primary member of a linear motor. The primary member with the coil elements G1, G2, G3 cooperates with a plurality of permanent magnets D1, D2, D3 and so forth which are arranged as the secondary member of the linear motor on the carriage element 61. In addition, a position sensor S is provided on each rail portion. The position sensor always exactly detects at what location the magnetic fields of the permanent magnets of the carriage element are to be found.

Layout examples for transport rail networks are set forth hereinafter, which can serve to effectively appropriately arrange the production stations of a confectionery machine and effectively to make beneficial use thereof.

By way of example in a series layout as shown in FIG. 31, the transport rail 8 extends in a linear configuration and has a beginning and an end. The production stations like P1, P2, P3 and so forth are arranged in a row along the transport rail.

A ring layout as shown in FIG. 32 has a transport rail 8 in a peripherally extending configuration and production stations like P1, P2, P3 and so forth are arranged in succession along the transport rail.

A bus layout as in FIG. 33 has a main rail 68 and laterally with respect to the main rail 68 production stations like P1, P2 and P3 and so forth; for that purpose the arrangement has branches 69, 70, 71 from the main rail to the respective production station so that a mold can branch to the production station or pass same.

A star layout as shown in FIG. 34 has a central production station P4 and transport rails 72 to 77 which are arranged in radially radiating relationship therewith to further production stations P1, P2, P3, and so forth.

There are hybrid forms of the above-indicated layouts, like for example the bus-ring layout shown in FIG. 35, which centrally has a bus layout with a main rail 68, from which at least one ring secondary rail 78 branches. At least one production station P1 is provided along the secondary rail 78.

The hybrid form of the star-ring layout in FIG. 36 has a central production station P4 and a plurality of ring-shaped transport rails 79, 80, 81 and 82 around the central production station, the production rails leading at least to a further production station P1.

The hybrid form of a star-bus layout as shown in FIG. 37 has a central production station P4 as well as a plurality of main transport rails 83 to 86 in bus form around the central production station. Lateral branches like the branch 87 lead from the main transport rails 83 to at least one production station P1.

The hybrid form of a ring-parallel layout, as shown in FIG. 38, has an endlessly circulating ring-shaped transport rail 8, wherein at least a part of the transport rail 8 is provided with at least one secondary rail 88 extending parallel to the transport rail 8. Production stations P1, P2 and P3 are arranged in series.

The hybrid form of a series-parallel layout as shown in FIG. 39 has a transport rail 8 with production stations P1 in a series, wherein the series has a beginning and an end. At least a part of the series transport rail has at least one secondary rail 88 which extends parallel to the transport rail and has production stations P2, P3 and so forth.

FIGS. 40*a* to 40*c* show a further embodiment of a transport system 1 in which a receiving device 11 cooperates with an additional movement device B for an auxiliary movement. In this example, a reciprocating auxiliary movement is produced in the Y-direction, that is to say horizontally and transversely relative to the transport rail 8, preferably at 90° relative to the transport rail.

For that purpose the receiving device 11 is connected to two carriage elements 89 and 90 and carried thereby. The additional movement device is so adapted that the auxiliary movement desired in the Y-direction can be produced by a movement of the two carriage elements towards or away from each other. To permit that, a linear guide 91 and 92 respectively is associated with each carriage element. A linear guide 91 is associated, oriented in the Y-direction, with a first carriage element 99. It ensures exact guidance of the receiving device transversely to the transport rail. The linear guide 92 associated with the second carriage element 90 is arranged at an angle of, for example, 30° to the transport rail. In that way, a movement of the second carriage element 90 in the transport direction can serve for the drive and at the same time the direction of movement is changed so that the receiving device 11 moves in the desired Y-direction.

For that purpose, the linear guide 91 includes a guide rail 91*a* and a mounting 91*b* and the linear guide 92 is provided with a guide rail 92*a* and a mounting 92*b*.

In the present example, the guide rails 91*a*/92*a* are connected to the receiving device 11 and the mounting 91*b* is connected to the carriage element 89 and the mounting 92*b* is connected to the carriage element 90.

FIG. 40*a* shows a neutral position in which the receiving device 11 is oriented in symmetrical relationship with the transport rail 8. The second carriage element 90 is so positioned that the mounting 92*b* is central relative to the guide rail 92*a*. From that neutral position the receiving device 11 can be moved transversely to both sides in the Y-direction.

In FIG. 40*b*, the receiving device 11 has been moved out of the neutral position by its maximum travel to the one side while in FIG. 40*c* it has been moved by its maximum travel to the opposite side. That additional movement device B for the Y-direction can be used to manufacture complex products like pretzels or pretzels with a filling or it is possible to produce decorations and carry out so-called make-up tasks. Like for example embelishments externally on a confectionery article with confectionery material that forms a contrast. For example, a chocolate Easter Bunny can be provided with eyes of white chocolate or a chocolate Santa Claus can have a beard of white chocolate.

Reference is now made to FIG. 41 to describe the control device 13 in FIGS. 1 to 4. It includes a processing unit V1 (processor). The processing unit V1 executes control software which is adapted to process items of information. The processing unit V1 has a data memory M1 associated therewith. The processing unit can process the data of all carriage elements in the transport system. At least it processes the data of given carriage elements of the transport system. Those carriage element data include at least the position data of a carriage element relative to the transport rail and/or the speed data of the carriage elements relative to the transport rail and/or data relating to which receiving device has a carriage element associated therewith. In addition, the processing unit can process data concerning the mold. The data relate to items of information as to whether a mold has passed through or left out a process step and/or process-relevant data like the temperature of a mold or a period of time that a mold spent in a production step, and so forth.

In addition there is provided an input unit E1, by means of which it is possible to input into the control software, in what sequence a mold is to be transported to individual production stations and the sequence can be stored in the data memory as the process plan.

FIG. 42 shows a perspective view of an embodiment of a frameless receiving device. The figure shows a carrier rail 8 and a mold 12. At the underside of the mold it is possible to see individual cavities K1, K2, K3 and so forth. Confectionery material can be introduced into those cavities from the top side. The cavities for the confectionery articles have round bottoms and it is possible to see the lateral wall with an incline for good removal from the mold of finished confectionery articles. The mold is carried by two carriage elements 31 and 32 moveable along the carrier rail. Provided on the carriage element 31 is an adaptor portion 93, on which a carrier bar 94 is in turn arranged. Likewise the carriage element 32 has an adaptor portion 95 and a carrier bar 96 also arranged thereon. The adaptor portion 93 is rotatable about an axis A1 relative to the carriage element 31. Equally the adaptor portion 35 is mounted rotatably about an axis A2 relative to the carriage element 32.

In the present embodiment there are four positioning aids in a symmetrical arrangement, more specifically there is a respective positioning aid at each of the two ends of a carrier bar. In FIG. 42, of those positioning aids, the positioning aid 97 is to be seen on the carrier bar 94 and the positioning aid 98 on the carrier bar 96.

Each positioning aid is of a two-part structure, that is to say it has a lower positioning element $P_o$ and an upper positioning element $P_u$ which can cooperate with each other. In the FIG. 42a embodiment, the lower positioning element $P_u$ arranged on the carrier bar 94 is a holding magnet 97a, which is fixed to the carrier bar 94 with a stud bolt S1. In matching relationship therewith the upper positioning element $P_o$ is arranged on an adaptor portion 99 at the underside of the mold 12 and is also in the form of a holding magnet 97b. To maintain the correct spacing between the positioning aids 97 and 98, the distance of the carriage elements 31 and 32 must be appropriate relative to each other. For that purpose, the position of each of the carriage elements can be measured relative to the transport rail 8 and the distance of the carriage elements 31 and 32 is controllable with an adequate degree of accuracy. Although positioning aids are provided on two carrier bars, each of which is fixed to a carriage element moveable individually along the transport rail, the function of the positioning aids is guaranteed by virtue of exact controllability of the carriage elements 31 and 32 relative to each other. It will be appreciated that positioning aids can also be provided in a transport system in which only one respective carriage element carries a receiving device for a mold. The requirement that the spacing between carriage elements has to be exactly controlled relative to each other then no longer applies.

To be able to arrange an upper positioning element $P_o$ on the mold 12, there is provided an adaptor portion 99. That adaptor portion is adapted to a transverse strut 12c of the mold 12 and fixed with a screw connection. Alternatively, it is possible to use an adhesive connection or a welded connection to connect the adaptor portion 99 to the mold 12. The adaptor portion 99 can additionally be initially formed with the mold as an integral constituent part thereof. The holding magnet 97b is mounted to the adaptor portion 99 by means of a stud bolt S2.

FIG. 42b shows an alternative positioning aid 97 without holding magnets. Once again an adaptor portion 99 is mounted to a transverse strut 12c of the mold 12 at the underside thereof. Unlike the previous embodiment, here the upper positioning element $P_o$ is in the form of a tapered bore 99a in the adaptor portion 99. The lower positioning element $P_u$ is in the form of a tapered pin 101 matching same and is mounted to the carrier rail 94. The bore 99a and the tapered pin 101 can be centred relative to each other.

When a mold 12 is fitted on to that frameless receiving device then the positioning aids sufficiently accurately orient the position of the mold. In addition, the positioning aids counteract lateral displacement of the mold. Relative to the support plane on which the mold rests it is secured to prevent displacement by virtue of the positioning aids.

LIST OF REFERENCES 1 transport system
2 confectionery machine
3 molding station
4 shell shaping station
5 casting station
6 cooling station
7 demoulding station
8 transport rail
8a transport rail
8b transport rail
8c rail portion
9 drive device
10 carriage element
10a carriage element
10b carriage element
10c carriage element
10d carriage element
11 receiving device
12 casting mold
12a casting mold portion
12b casting mold portion
12c transverse strut
13 control device
14 transport rail network
15 main rail
16 rail portion
17 rail portion
180° curve
180° curve
20 branch rail
21 branch rail
22 branch rail
23 branch rail
24 branch rail
25 branch rail
26 branch rail
27 secondary rail
28 secondary rail branch
29 secondary rail branch

| | |
|---|---|
| 30 carriage element | 93 adaptor portion |
| 31 carriage element | 94 support bar |
| 32 joint bar | 95 adaptor portion |
| 33 joint bar | 96 support bar |
| 34 joint bar | 97 positioning aid |
| 35 joint bar | 97a holding magnet |
| 36 joint bar | 97b holding magnet |
| 37 joint bar | 98 positioning aid |
| 38 carriage element | 99 adaptor portion |
| 39 joint bar | 99a conical bore |
| 40 horizontal axis | 100 screw connection |
| 41 spindle | 101 conical pin |
| 42 first carriage element | A1 axis of rotation |
| 43 nut thread element | A2 axis of rotation |
| 44 external tooth arrangement | A3 axis of rotation |
| 45 toothed rack | B movement device |
| 46 second carriage element | C1 control unit |
| 47 first carriage element | D1 permanent magnet |
| 48 first joint bar | D2 permanent magnet |
| 49 second joint bar | D3 permanent magnet |
| 50 second carriage element | F1 spring element |
| 51 first carriage element | E1 input unit |
| 52 second carriage element | F2 spring element |
| 53 toothed rack | G1 coil element |
| 54 second carriage element | G2 coil element |
| 55 carriage element | G3 coil element |
| 56 adaptor | K1 cavity |
| 57 rotary joint | K2 cavity |
| 58 axis of rotation | K3 cavity |
| 59 bore | M1 data memory |
| 60 carriage element | P1 production station |
| 61 carriage element | P2 production station |
| 62 carriage element | P3 production station |
| 63 carriage element | $P_u$ lower positioning element |
| 64 rail intermediate portion | $P_o$ upper positioning element |
| 65 rail intermediate portion | P4 central production station |
| 66 carriage element | R axis of rotation |
| 67 region (coil) | R1 lick-off roller |
| 68 main rail | R2 lick-off roller |
| 69 branch | S position sensor |
| 70 branch | S1 stud bolt |
| 71 branch | S2 stud bolt |
| 72 transport rail | T1 electric motor |
| 73 transport rail | V1 processing unit |
| 74 transport rail | X1 trigger point |
| 75 transport rail | X2 trigger point |
| 76 transport rail | X3 trigger point |
| 77 transport rail | Z gear element |
| 78 secondary rail | α angle |
| 79 transport rail | |
| 80 transport rail | |
| 81 transport rail | |
| 82 transport rail | |
| 83 main transport rail | |
| 84 main transport rail | |
| 85 main transport rail | |
| 86 main transport rail | |
| 87 branch | |
| 88 secondary rail | |
| 89 carriage element | |
| 90 carriage element | |
| 91 linear guide | |
| 91a guide rail | |
| 91b mounting | |
| 92 linear guide | |
| 92a guide rail | |
| 92b mounting | |

The invention claimed is:

1. A transport system (1) for an industrial confectionery machine (2) which comprises a plurality of production stations (P1, P2, P3, P4, 3, 4, 5, 6, 7) and molds (12) for producing at least one confectionery article, wherein each mold (12) can be transported to the production stations (P1, P2, P3, P4, 3, 4, 5, 6, 7) in the confectionery machine (2) for successive production steps, the transport system including
a transport rail (8, 8a, 8b, 72, 73, 74, 75, 76, 77, 79, 80, 81, 82),
a drive device (9, T1, 67, D1, D2, D3, G1, G2, G3) with which a transport movement for one mold (12) can be produced to transport the mold (12) along the transport rail (8, 8a, 8b, 72, 73, 74, 75, 76, 77, 79, 80, 81, 82) to the production stations (P1, P2, P3, P4, 3, 4, 5, 6, 7),
wherein the drive device (9, T1, 67, D1, D2, D3, G1, G2, G3) has at least two rail-guided carriage elements (10, 38, 42, 46, 47, 50, 51, 54, 55, 60, 61, 62, 63, 66)

that can be coupled to the transport rail spaced from each other along the transport rail and one of the carriage elements is drivable individually along the transport rail and can be moved relative to the other one of the carriage elements along the transport rail to provide a main movement, the carriage elements (10, 38, 42, 46, 47, 50, 51, 54, 55, 60, 61, 62, 63, 66) are connected to a receiving device (11) in which at least one mold (12) can be received, and a control device (13) configured to control the main movement of one of the carriage elements (10, 38, 42, 46, 47, 50, 51, 54, 55, 60, 61, 62, 63, 66) together with the receiving device (11) along the transport rail (8, 8a, 8b, 72, 73, 74, 75, 76, 77, 79, 80, 81, 82) in a transport direction to one of the production stations (P1, P2, P3, P4, 3, 4, 5, 6, 7), and that in addition by means of the control device (13) an auxiliary movement can be additionally transmitted into the receiving device (11) in order to suitably move the mold (12) for the production step.

2. The transport system as set forth in claim 1, wherein at least one of the carriage elements (10, 38, 42, 46, 47, 50, 51, 54, 55, 60, 61, 62, 63, 66) is provided with an additional movement device (B) which can contribute to implementation of the auxiliary movement of the mold (12) and that the movement device (B) is arranged between the at least one carriage element and the receiving device (11) for the mold.

3. The transport system as set forth in claim 2, wherein the at least one of the two carriage elements (10, 38, 42, 46, 47, 50, 51, 54, 55, 60, 61, 62, 63, 66) is coupled to the movement device (B) for producing the auxiliary movement.

4. The transport system as set forth in claim 1, wherein the transport rail (8) is enlarged to give a transport rail network (14) which has curves (18, 19) and/or switch devices and/or crossings.

5. The transport system as set forth in claim 4, wherein the transport rail network (14) has a ring layout or a series layout, a bus layout, a star layout, or hybrid forms like a bus-ring layout, a star-ring layout, a star-bus layout, a ring-parallel layout or a series-parallel layout.

6. The transport system as set forth in claim 1, further comprising an electric motor (T1) for the individual drive of at least one of the carriage elements (10, 38, 42, 46, 47, 50, 51, 54, 55, 60, 61, 62, 63, 66) along the transport rail, the electric motor is arranged at the at least one carriage element or is in the form of a linear motor with the at least one carriage element as the motor and the transport rail as the stator, with a magnet (D1, D2, D3) which is arranged on the at least one carriage element and with which a rotor magnetic field can be generated, and a coil (67, G1, G2, G3) which is provided on the transport rail and with which a stator magnetic field can be generated.

7. The transport system as set forth in claim 1, wherein the control device (13) includes at least one processing unit (V1) and that the processing unit (V1) is adapted to execute control software and to process items of information, and that at least one data memory (M1) is associated with the processing unit.

8. The transport system as set forth in claim 7, wherein the data of all carriage elements (10, 38, 42, 46, 47, 50, 51, 54, 55, 60, 61, 62, 63, 66) present in the transport system can be processed in the processing unit (V1) and that the rail element data include at least the position data of the carriage elements relative to the transport rail (8, 8a, 8b, 72, 73, 74, 75, 76, 77, 79, 80, 81, 82) and/or speed data of the carriage elements relative to the transport rail and/or data which relate to which receiving device (11) has which carriage element associated therewith.

9. The transport system as set forth in claim 7, wherein data concerning the mold (12) can be processed in the processing unit (V1), which data relate to information as to whether a mold has passed through or left out a process step and/or to process-relevant data like the temperature of a mold or a period of time that the mold spent in a production step.

10. The transport system as set forth in claim 7, wherein the control drive further includes an input unit (E1), by which it is possible to input into the control software, in what sequence a mold (12) is to be transported to individual production stations (P1, P2, P3, P4, 3, 4, 5, 6, 7) and said sequence can be filed as a process plan in the data memory (M1).

11. The transport system as set forth in claim 10, wherein at least one parameter set relating to a production step which the mold has passed through can be stored in the process plan for each mold (12).

12. The transport system as set forth in claim 7, wherein the transport rail (8, 8a, 8b, 72, 73, 74, 75, 76, 77, 79, 80, 81, 82) is virtually imaged in the control software and process-relevant trigger points (X1, X2, X3) are provided along the transport rail, the real transport movement of the carriage elements (10, 38, 42, 46, 47, 50, 51, 54, 55, 60, 61, 62, 63, 66) is also moved as a virtual carriage position point in the control software and that a process can be activated under software control when a carriage position point reaches a trigger point (X1, X2, X3).

13. The transport system (1) according to claim 1, wherein the carriage elements (10, 55, 61, 62, 63) can be coupled to and moved along a side surface of the transport rail (8), and that the carriage elements (10) are held laterally by magnetic force.

14. The transport system (1) according to claim 13, wherein the carriage elements (10, 55, 61, 62, 63) are of a symmetrical configuration that has a left coupling side and a right coupling side, so that the left coupling side can be coupled to the transport rail (8, 8a) arranged on the left or conversely the right coupling side can be coupled to the transport rail (8, 8b) arranged on the right.

15. The transport system (1) according to claim 14, wherein each carriage element can be switched over from a coupling with the left coupling side to the transport rail (8, 8a) provided at the left of each carriage element to coupling at the transport rail (8, 8b) arranged on the right.

16. The transport system (1) according to claim 1, wherein the transport rail (8) is of a modular structure of a plurality of rail portions (8c) placed in series, that each of the rail portion (8c) includes a position sensor (S) and is provided with a plurality of coil elements (G1, G2, G3) provided along the rail portion (8c) and together form a long stator, that the long stator forms the primary member of a linear motor and cooperates with a plurality of permanent magnets (D1, D2, D3) arranged as the secondary member of the linear motor on each carriage element (61).

17. The transport system (1) according to claim 1, wherein each carriage element is connected to the receiving device through at least one joint bar (32, 33, 34, 35, 36, 37).

18. A transport system (1) for an industrial confectionery machine (2) which comprises a plurality of production stations (P1, P2, P3, P4, 3, 4, 5, 6, 7) and molds (12) for producing at least one confectionery article, wherein each mold (12) can be transported to the production stations (P1, P2, P3, P4, 3, 4, 5, 6, 7) in the confectionery machine (2) for successive production steps, the transport system including
a transport rail (8, 8a, 8b, 72, 73, 74, 75, 76, 77, 79, 80, 81, 82) and
a drive device (9, T1, 67, D1, D2, D3, G1, G2, G3) with which a transport movement for one mold (12) can be produced to transport the mold (2) along the transport rail (8, 8a, 8b, 72, 73, 74, 75, 76, 77, 79, 80, 81, 82) to the production stations (P1, P2, P3, P4, 3, 4, 5, 6, 7), wherein the drive device (9, T1, 67, D1, D2, D3, G1, G2, G3) has at least two rail-guided carriage elements (10, 38, 42, 46, 47, 50, 51, 54, 55, 60, 61, 62, 63, 66) that can be coupled to the transport rail, are drivable individually along the transport rail and can be moved relative to one another along the transport rail (8), the carriage elements (10, 38, 42, 46, 47, 50, 51, 54, 55, 60, 61, 62, 63, 66) cooperate with a receiving device (11) in which at least one mold (12) can be received, and
a control device (13) configured to control a main movement of the carriage elements (10, 38, 42, 46, 47, 50, 51, 54, 55, 60, 61, 62, 63, 66) together with the receiving device (11) along the transport rail (8, 8a, 8b, 72, 73, 74, 75, 76, 77, 79, 80, 81, 82) in a transport direction to the production stations (P1, P2, P3, P4, 3, 4, 5, 6, 7), and that in addition by the control device (13) an auxiliary movement can be additionally transmitted into the receiving device (11) in order to suitably move the mold (12) for the production step.

19. The transport system (1) according to claim 18, wherein
the carriage elements (10, 55, 61, 62, 63) can be coupled to and moved along a side surface of the transport rail (8), and that the carriage element (10) is held laterally by magnetic force,
the carriage elements (10, 55, 61, 62, 63) are of a symmetrical configuration that has a left coupling side and a right coupling side, so that the left coupling side can be coupled to the transport rail (8, 8a) arranged on the left or conversely the right coupling side can be coupled to the transport rail (8, 8b) arranged on the right, and
the carriage element can be switched over from a coupling with the left coupling side to the transport rail (8, 8a) provided at the left of the carriage element to coupling at the transport rail (8, 8b) arranged on the right.

20. The transport system (1) according to claim 18, wherein the transport rail (8) is of a modular structure of a plurality of rail portions (8c) placed in series, that each of the rail portion (8c) includes a position sensor (S) and is provided with a plurality of coil elements (G1, G2, G3) provided along the rail portion (8c) and together form a long stator, that the long stator forms the primary member of a linear motor and cooperates with a plurality of permanent magnets (D1, D2, D3) arranged as the secondary member of the linear motor on each carriage element (61).

* * * * *